(12) United States Patent
Kobayashi

(10) Patent No.: US 10,804,831 B2
(45) Date of Patent: Oct. 13, 2020

(54) CONTROL APPARATUS FOR ALTERNATING-CURRENT ROTARY ELECTRIC MACHINE

(71) Applicant: DENSO CORPORATION, Kariya, Aichi-pref. (JP)

(72) Inventor: Naoto Kobayashi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/254,327

(22) Filed: Jan. 22, 2019

(65) Prior Publication Data
US 2019/0229664 A1 Jul. 25, 2019

(30) Foreign Application Priority Data

Jan. 23, 2018 (JP) .................. 2018-008951

(51) Int. Cl.
*H02P 3/00* (2006.01)
*H02P 21/14* (2016.01)
*H02P 29/68* (2016.01)
*H02P 21/22* (2016.01)
*H02P 27/08* (2006.01)

(52) U.S. Cl.
CPC ............ *H02P 21/141* (2013.01); *H02P 21/22* (2016.02); *H02P 27/085* (2013.01); *H02P 29/68* (2016.02)

(58) Field of Classification Search
CPC .. H02M 7/53871; H02P 21/141; H02P 21/22; H02P 27/08
USPC .................... 318/255, 490, 400.02
See application file for complete search history.

(56) References Cited

U.S. PATENT DOCUMENTS

| 5,650,706 A | 7/1997 | Yamada et al. |
| 5,841,263 A | 11/1998 | Kaneko et al. |
| 9,059,653 B2 * | 6/2015 | Shimada ................. H02P 6/183 |
| 2008/0007198 A1 * | 1/2008 | Kinpara .................. H02P 21/14 318/807 |
| 2008/0186000 A1 * | 8/2008 | Kimura ................. B60L 15/025 322/23 |
| 2009/0261774 A1 * | 10/2009 | Yuuki .................. H02K 1/2766 318/720 |
| 2013/0278200 A1 * | 10/2013 | Fujii ....................... H02P 21/06 318/722 |

(Continued)

FOREIGN PATENT DOCUMENTS

JP H09-023692 A 1/1997

*Primary Examiner* — Eduardo Colon Santana
*Assistant Examiner* — Gabriel Agared
(74) *Attorney, Agent, or Firm* — Oliff PLC

(57) ABSTRACT

In a magnetic flux variation estimator of a control apparatus, a command voltage corrector corrects d- and q-axis command voltages to reduce a deviation between each of the d- and q-axis command voltages and a corresponding actual voltage to be applied to a rotary electric machine, thus outputting a corrected d-axis command voltage and a corrected q-axis command voltage. A standard voltage calculator calculates, based on an electrical angular velocity of the rotary electric machine and a current flowing in the rotary electric machine, a d-axis standard voltage and a q-axis standard voltage to be applied to the rotary electric machine while the rotary electric machine is in a predetermined standard state. An estimator estimates a magnetic flux variation as a function of the corrected d-axis command voltage, the corrected q-axis command voltage, and the q-axis standard voltage.

10 Claims, 15 Drawing Sheets

(56) References Cited

U.S. PATENT DOCUMENTS

| | | | | |
|---|---|---|---|---|
| 2015/0137720 A1* | 5/2015 | Kobayashi | ............ | H02P 21/141 |
| | | | | 318/400.15 |
| 2015/0333681 A1* | 11/2015 | Matsuki | .................. | H02P 21/06 |
| | | | | 318/400.02 |
| 2015/0372627 A1* | 12/2015 | Kim | ...................... | H02P 21/141 |
| | | | | 318/801 |
| 2017/0155349 A1* | 6/2017 | Kim | .......................... | H02P 6/28 |

* cited by examiner

VOLTAGE DROP Vf ACROSS FLYBACK DIODE

VOLTAGE DROP Vce ACROSS SWITCHING ELEMENT

CONTROL APPARATUS FOR ALTERNATING-CURRENT ROTARY ELECTRIC MACHINE

CROSS REFERENCE TO RELATED APPLICATIONS

This application is based on and claims the benefit of priority from Japanese Patent Application 2018-008951 filed on Jan. 23, 2018, the disclosure of which is incorporated in its entirety herein by reference.

TECHNICAL FIELD

The present disclosure relates to control apparatuses for controlling a permanent-magnet alternating-current (AC) rotary electric machine.

BACKGROUND

There are known technologies for estimating magnetic flux of a permanent magnet unit mounted to a permanent-magnet AC rotary electric machine.

SUMMARY

According to an exemplary aspect of the present disclosure, there is provided a control apparatus including a magnetic flux variation estimator. The magnetic flux variation estimator includes a command voltage corrector that corrects d- and q-axis command voltages to reduce a deviation between each of the d- and q-axis command voltages and a corresponding actual voltage to be applied to a rotary electric machine including a permanent magnet unit, thus outputting a corrected d-axis command voltage and a corrected q-axis command voltage. The magnetic flux variation estimator includes a standard voltage calculator that calculates, based on an electrical angular velocity of the rotary electric machine and a current flowing in the rotary electric machine, a d-axis standard voltage and a q-axis standard voltage to be applied to the rotary electric machine while the rotary electric machine is in a predetermined standard state. The magnetic flux variation estimator includes an estimator that estimates a magnetic flux variation as a function of the corrected d-axis command voltage, the corrected q-axis command voltage, and the q-axis standard voltage.

BRIEF DESCRIPTION OF THE DRAWINGS

Other aspects of the present disclosure will become apparent from the following description of embodiments with reference to the accompanying drawings in which.

Figure 1:
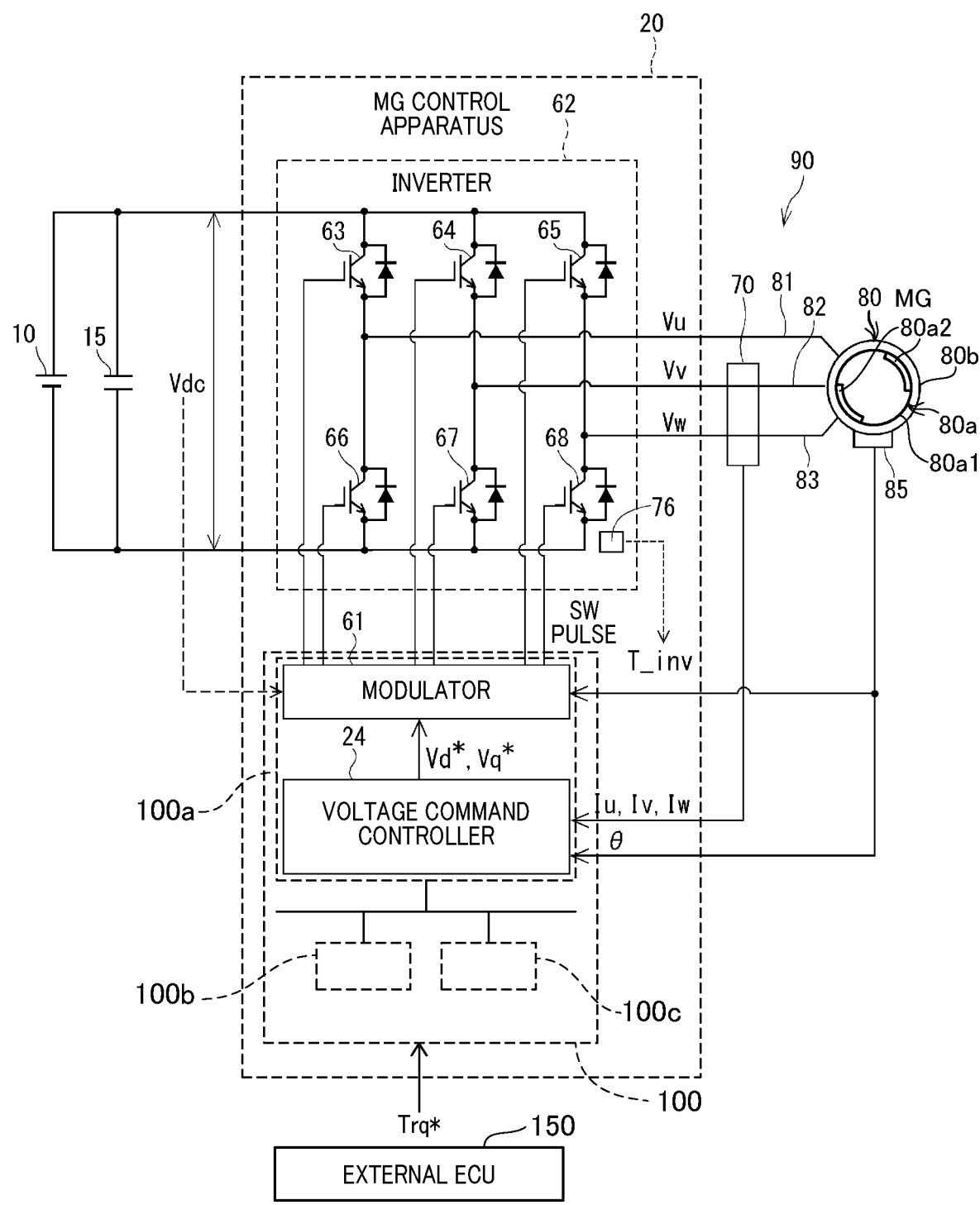
FIG. 1 is an overall structural diagram schematically illustrating a motor-generator drive system installed in a vehicle according to an exemplary embodiment of the present disclosure.

DETAILED DESCRIPTION OF EMBODIMENT
INVENTOR'S VIEWPOINT

One type of control apparatuses for a salient-pole permanent-magnet motor, which is an example of a permanent-magnet AC rotary electric machine, is configured to control on-off switching operations of each pair of upper- and lower-arm switching elements of a power converter for the corresponding phase of the permanent-magnet motor. The control apparatus is also configured to adjust d- and q-axis voltages actually applied to the salient-pole permanent-magnet motor in accordance with predetermined d-and q-axis command voltages.

The control apparatus configured as set forth above specially performs a method of estimating magnetic flux of a permanent magnet unit of the motor in accordance with the actual q-axis voltage applied to the motor from the power converter and measured by a voltage sensor. Then, the method detects demagnetization of the permanent magnet unit and/or corrects errors in the output torque of the motor in accordance with the estimated magnetic flux of the permanent magnet.

Let us assume that (1) Magnetic flux of a permanent magnet unit of a permanent-magnet AC motor, which is an example of a permanent magnet AC rotary electric machine, is defined as standard magnetic flux upon the AC motor having a predetermined standard condition (2) A deviation of the magnetic flux of the permanent magnet unit of the AC motor from the standard magnetic flux is defined as a magnetic flux variation We apply the above method to the permanent magnet AC motor, making it possible to estimate the magnetic flux variation of the AC motor in accordance with the actual q-axis voltage measured by a voltage sensor.

Using the q-axis command voltage in place of the actual q-axis voltage measured by a voltage sensor enables the voltage sensor to be eliminated from the AC motor.

As to this viewpoint, it is known that there is a gap between the actual q-axis voltage applied to the AC motor and the q-axis command voltage due to, for example, (1) Dead times each representing a period during which the upper- and lower-arm switching elements of a corresponding pair are simultaneously turned off (2) A voltage drop across each switching element of the power converter This gap may cause an error in the magnetic flux variation estimated by the above method using the q-axis command voltage.

The above method estimates the magnetic-flux variation based on the q-axis voltage without using the d-axis voltage. This may result in the estimated magnetic flux variation being susceptible to a change in a measurement error of the voltage sensor and/or a change in the inductances as machine constant parameters of the AC motor. This may result in a reduction of the estimation accuracy of the above method.

DETAILED DESCRIPTION OF EMBODIMENT

From the above viewpoint, the following describes an exemplary embodiment of the present disclosure with reference to the accompanying drawings. The present disclosure embodies a motor-generator (MG) control apparatus 20 according to the exemplary embodiment, which is an example of a control apparatus for a permanent-magnet AC rotary electric machine. That is, the MG control apparatus is configured to control energization of a motor-generator (MG) 80 that serves as a power engine of a hybrid vehicle or an electric vehicle.

The following describes an example of the overall structure of an MG driving system 90 with reference to FIG. 1. The MG driving system 90 is installed in a vehicle, typically a hybrid vehicle equipped with an engine (not shown).

Referring to FIG. 1, the MG driving system 90 includes the MG control apparatus 20. Note that FIG. 1 schematically illustrates a common structure of the MG control apparatus 20 while a specific structure of the MG control apparatus 20, which will be described later, according to the exemplary embodiment is omitted in illustration in FIG. 1.

The MG driving system 90 also includes the MG 80, a battery 10 as an example of direct-current (DC) power sources, and the MG control apparatus 20 includes an inverter 62.

The MG 80 is for example designed as a permanent magnet synchronous three-phase AC motor-generator. The MG 80 installed in the hybrid vehicle is coupled to a driving axle having at both ends driving wheels via a gear mechanism, such as a transmission. That is, the MG 80 serves as a motor in a power running mode to generate torque that rotatably drives the driving axle to thereby rotatably drive the driving wheels via the gear mechanism. The MG 80 also serves as a generator in a regenerative mode to generate electrical power based on torque transferred from the engine and/or the driving wheels, and charge the generated electrical power to the battery 10.

The MG 80 is provided with a rotor 80a and a stator 80b. Note that FIG. 1 schematically illustrates the structure of the MG 80.

The rotor 80a includes a rotor core 80a1, and a permanent magnet unit 80a2 that is comprised of at least one pair of permanent magnets embedded in the rotor core 80a1. That is, the MG 80 is designed as an interior permanent magnet synchronous motor (IPMSM). Note that the MG 80 can be designed as a surface permanent magnet synchronous motor (SPMSM).

The rotor 80a has a direct axis (d-axis) in line with a direction of magnetic flux created by an N pole of the permanent magnet unit 80a2. The rotor 80a also has a quadrature axis (q-axis) with a phase being $\pi/2$-radian electrical angle leading with respect to a corresponding d-axis during rotation of the rotor 80a. In other words, the q-axis is electromagnetically perpendicular to the d-axis.

The d and q axes constitute a d-q coordinate system, i.e. a two-phase rotating coordinate system, defined to the rotor 80a.

The stator 80b includes a stator core such that the rotor 80a is rotatably arranged with respect to the stator core. The stator 80b also includes a set of three-phase windings, i.e. armature windings, 81, 82, and 83 wound in the stator core.

The three-phase, i.e. U-, V-, and W-phase, windings 81, 82, and 83 are wound in the stator core such that the U-, V-, and W-phase windings 81, 82, and 83 are shifted by an electrical angle of, for example, $2\pi/3$ radian in phase from each other.

For example, the three-phase windings 81, 82, and 83 each have a first end connected to a common junction, i.e. a neutral point, and a second end, which is opposite to the first end, to a separate terminal in, for example, a star-configuration.

The MG control apparatus 20 includes an inverter 62, and is configured such that the inverter 62 converts DC power output from the battery 10 into three-phase alternating-current (AC) voltages, and supplies the three-phase AC voltages to the respective three-phase windings 81, 82, and 83. This creates a rotating magnetic field. This enables the rotor 80a to turn based on magnetic attractive force between the rotating magnetic field and the magnetic flux of the rotor 10a.

A chargeable DC battery, such as a nickel-hydrogen battery or a lithium-ion battery, can be used as the battery 10. An electrical double layer capacitor can also be used as the DC power source in place of the battery 10.

The MG control apparatus 20 includes a current sensor 70 arranged to measure at least two of three-phase currents Iu, Iv, and Iw respectively flowing through the U-, V-, and W-phase windings 81, 82, and 83. If the current sensor 70 is configured to measure two phase currents, such s V- and W-phase currents Iv and Iw flowing through the respective V- and W-phase windings 82 and 83, the current sensor 70 or MG control apparatus 20 can be configured to calculate the remaining U-phase current Iu using Kirchhoff's law.

The MG control apparatus 20 also includes a rotational angle sensor 85. The rotational angle sensor 85, which is comprised of, for example, a resolver, is disposed to be adjacent to, for example, the rotor 80a of the MG 80. The rotational angle sensor 85 is configured to measure, i.e. monitor, a rotational electrical angle θ of the rotor 80a of the MG 80, and output the rotational electrical angle θ to the MG control apparatus 20.

The inverter 62 includes six switching elements 63 to 68 connected in bridge configuration, and each switching element 63-68 includes a flyback or free-wheel diode D.

Specifically, the switching elements 63 and 66 are a pair of U-phase upper- and lower-arm switching elements connected in series to each other, and the switching elements 64 and 67 are a pair of V-phase upper- and lower-arm switching elements connected in series to each other. Additionally, the switching elements 65 and 68 are a pair of W-phase upper- and lower-arm switching elements connected in series to each other.

Each switching element 63 to 68 includes for example a main semiconductor switching element, such as an IGBT. That is, the emitter of each of the upper-arm switching elements 63 to 65 is connected to the collector of the corresponding one of the lower-arm switching elements 66 to 68.

The collectors of the switching elements 63 to 65 are commonly connected to the positive terminal of the battery 10, and the emitters of the switching elements 66 to 68 are connected to the negative terminal of the battery 10. This results in the first pair of switching elements 63 and 66, the second pair of switching elements 64 and 67, and the third pair of switching elements 65 and 68 being connected in parallel to the battery 10.

The connection point between the U-phase upper- and lower-arm switching elements 63 and 66 is connected to the separate terminal of the U-phase winding 81, and the connection point between the V-phase upper- and lower-arm switching elements 64 and 67 is connected to the separate terminal of the V-phase winding 82. Additionally, the connection point between the W-phase upper- and lower-arm switching elements 65 and 68 is connected to the separate terminal of the W-phase winding 83.

Each of the flyback diodes D is connected in antiparallel to a corresponding one of the IGBTs of the switching elements 63 to 68. Each of the flyback diodes D allows a current to flow from the low-potential side, i.e. emitter side, to the high-potential side, i.e. the collector side. For example, the pair of IGBTs and corresponding flyback diodes D for each phase can be modularized as a power module The MG control apparatus 20 includes a temperature sensor 76 for measuring a temperature of the inverter 62 as an inverter temperature T_inv. For example, if the switching elements 63 to 68 and the diodes D are mounted to a circuit board so as to be packaged, the temperature sensor 76 is mounted to the circuit board. The temperature sensor 76 is configured to measure the inverter temperature T_inv as a temperature of each switching element 63 to 68. For example, the temperature sensor 76 can be arranged to be close to the switching elements 63 to 68, and to measure the ambient temperature around the switching elements 63 to 68 as the inverter temperature T_inv. The MG control apparatus 20 can include temperature-sensitive elements, such as temperature-sensitive diodes, and the temperature-sensitive elements can be configured to measure the respective switching elements 63 to 68.

The MG control apparatus 20 includes a smoothing capacitor 15 connected in parallel to the battery 10 at the input side of the smoothing capacitor 15. The smoothing capacitor 15 is operative to smooth a DC voltage, output from the battery 10, thus outputting a smoothed DC voltage Vdc as an inverter input voltage. Note that the smoothed DC voltage Vdc will be simply referred to as a DC voltage Vdc hereinafter.

The DC voltage Vdc is directly input to the inverter 60. That is, the MG control apparatus 20 includes no boosting converters between the battery 10 and the inverter 62, but can include a boosting converter between the battery 10 and the inverter 62. The boosting converter can be configured to boost the DC voltage, and output a boosted DC voltage as the inverter input voltage to be input to the inverter 62.

The MG control apparatus 20 is also operative to obtain the DC voltage Vdc input to the inverter 62.

The MG control apparatus 20 includes a controller 100 designed as, for example, a microcomputer circuit. Specifically, the controller 100 essentially includes, for example, a CPU, i.e. a processor, 100a, a memory 100b comprised of, for example, a RAM and a ROM, and a peripheral circuit 100c; the ROM is an example of a non-transitory storage medium. At least part of all functions provided by the controller 100 can be implemented by at least one processor; the at least one processor can be comprised of (1) The combination of at least one programmable processing unit, i.e. at least one programmable logic circuit, and at least one memory (2) At least one hardwired logic circuit (3) At least one hardwired-logic and programmable-logic hybrid circuit Specifically, the controller 100 is configured such that the CPU 100a performs instructions of programs stored in the memory 100b, thus performing predetermined software tasks associated with the hybrid vehicle. The controller 100 can also be configured such that the at least one special-purpose electronic circuit performs predetermined hardware tasks associated with the MG 80. The controller 100 can be configured to perform both the software tasks and the hardware tasks.

The gates, i.e. control terminals, of the switching elements 63 to 68 are connected to the controller 100. The upper- and lower-arm switching elements of each pair are complementarily turned on under control of the controller 100.

The controller 100 functionally includes a voltage command calculator 24, a dq converter 29, a modulator 61, an angular velocity calculator 86, and a magnetic flux variation estimator 30.

That is, the MG control apparatus 20 includes the command voltage calculator 24, the dq converter 29, the modulator 61, the angular velocity calculator 86, the magnetic flux variation estimator 30, and the inverter 62.

Figure 2:
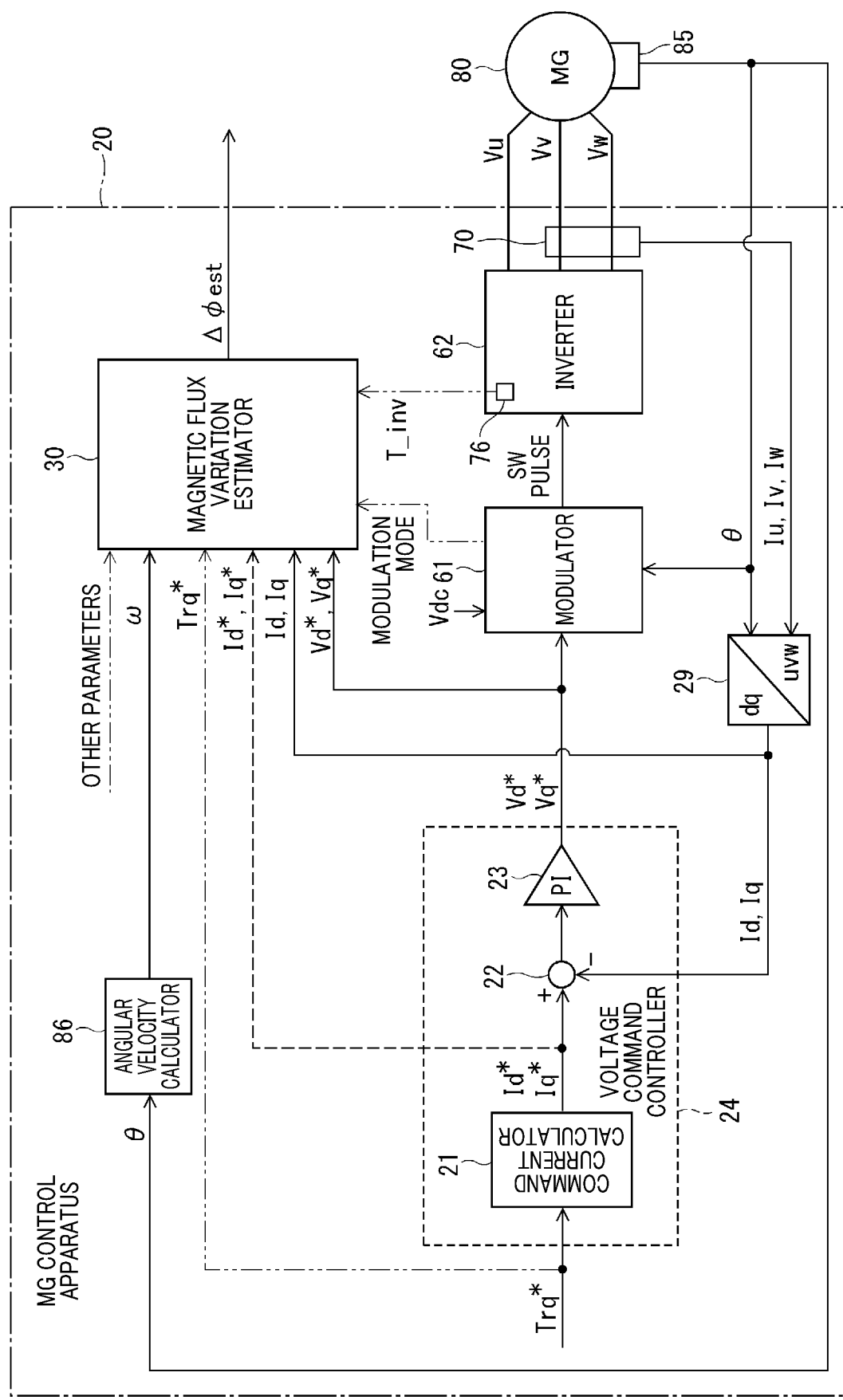
FIG. 2 is a block diagram schematically illustrating the structure of an MG control apparatus illustrated in FIG. 1.

As illustrated in FIG. 2, the MG control apparatus 20 according to the exemplary embodiment is configured to perform, for example, a current feedback control task to thereby calculate d- and q-axis command voltages Vd* and Vq* to be applied to the MG 80 in accordance with (1) Request torque Trq* input to the MG control apparatus 20 from an external electronic control unit (ECU) 150

(2) The three-phase currents Iu, Iv, and Iw fed back to the MG control apparatus 20 from the current sensor 70

(3) The rotational electric angle θ fed back to the MG control apparatus 20 from the rotational angle sensor 85

The MG control apparatus 20 can be configured to perform a torque feedback control task to thereby compare an estimated value of the output torque of the MG 80 with the request torque Trq*, and adjust, based on the comparison results, the pattern of a pulse output voltage to be output to the MG 80, thus causing the output torque of the MG 80 to follow the request torque Trq*.

Each of the current feedback control task and the torque feedback control task uses known vector control based on the d-q coordinate system, i.e. the two-phase rotating coordinate system, defined relative to the rotor 80a.

Referring to FIG. 2, the dq converter 29 samples the at least two phase currents Iv and Iw, calculates the U-phase current Iu based on the at least two phase currents Iv and Iw, and converts the three-phase currents Iu, Iv and Iw into d- and q-axis currents Id and Iq using the rotational electrical angle θ and, for example, a known conversion equation or map information. Thereafter, the dq converter 29 feeds the d- and q-axis currents Id and Iq back to the voltage command calculator 24.

In addition, the voltage command calculator 24 includes a command current calculator 21, a current deviation calculator 22, and a control unit 23.

The command current calculator 21 calculates a command d-axis current Id* and a command q-axis current Iq* in the d-q coordinate system of the rotor 80a of the MG 80 in accordance with the request torque Trq*. The command d-axis current Id* and command q-axis current Iq* are required to obtain torque of the MG 80 matching with the request torque Trq*.

For example, the command current calculator 21 may have a map in data-table format, in mathematical expression format, and/or program format. The map includes information indicative of a relationship between values of each of the d-axis current command Id* and the q-axis current command Iq*, and values of the request torque Trq*. Specifically, the command current calculator 21 refers to the map, and extracts a value of each of the d-axis current command Id* and the q-axis current command Iq* corresponding to the input value of the request torque Trq*. Note that a d-axis current and a q-axis current will be simply described as d-q axis currents hereinafter.

The current deviation calculator 22 subtracts the d-axis current Id fed back from the dq converter 29 from the d-axis current command Id* to thereby calculate a d-axis current deviation ΔId. The current deviation calculator 22 also subtracts the q-axis current value Iq fed back from the dq converter 29 from the q-axis current command Iq* to thereby calculate a q-axis current deviation ΔIq.

The control unit 23 performs a proportional-integral (PI) feedback operation using the d-axis current deviation ΔId as input data, and a proportional gain term and an integral gain term of a PI feedback control algorithm (PI algorithm). The PI feedback operation calculates a sinusoidal d-axis command voltage Vd* such that the d-axis current deviation ΔId converges to zero, thus causing the d-axis current Id to follow the d-axis command current Id*.

The control unit 23 performs a PI feedback operation using the q-axis current deviation ΔIq as input data, and a proportional gain term and an integral gain term of a PI feedback control algorithm (PI algorithm). The PI feedback operation calculates a sinusoidal q-axis command voltage Vq* such that the q-axis current deviation ΔIq converges to zero, thus causing the q-axis current Iq to follow the q-axis command current Iq*.

To the modulator 61, the DC voltage Vdc, the d-axis command voltage Vd* and q-axis command voltage Vq*, and the rotational electrical angle θ of the MG 80 are input.

Then, the modulator 61 generates switching pulse signals in accordance with the smoothed DC voltage Vdc, the d-axis command voltage Vd*, the q-axis command voltage Vq*, and the rotational electrical angle θ of the MG 80, and outputs the generated switching pulse signals to the inverter 62.

For example, the modulator 61 selectively performs, based on, for example, a predetermined modulation factor of the inverter 62 and RPM-torque characteristics of the MG 80, one of the following modulation modes including (1) A known three-phase modulation mode in pulse-width modulation (PWM) control (2) A known two-phase modulation mode in the PWM control (3) A known pulse pattern modulation mode (4) A known rectangular modulation mode Note that the two-phase modulation mode is configured to, for example, determine the switching pulse signals such that (1) The upper-arm switch of a successively selected one of the three phases is fixed to off for every 120 electrical degrees of the MG 80

(2) The lower-arm switch of the successively selected one of the three-phases is fixed to on for every 120 electrical degrees of the MG 80

That is, the three-phase modulation mode is configured to perform pulse width modulation based on comparison in magnitude between each of three-phase sinusoidal duty signals, which have a phase difference of 120 electrical degrees from each other, and are normalized by half of the DC voltage Vdc, and a carrier signal, such as a triangular carrier signal. This generates each of the switching pulse signals for the respective switching elements 63 to 68.

The two-phase modulation mode is configured to perform, for example, a two-phase modulation task that calculates command duties such that (1) The upper-arm switch of a successively selected one of the three phases is fixed to off for every 120 electrical degrees of the MG 80

(2) The lower-arm switch of the successively selected one of the three-phases is fixed to on for every 120 electrical degrees of the MG 80

That is, for every 120 electrical degrees, two of the three-phase command duties based on the two-phase modulation are determined to enable a sinusoidal line-to-line voltage to be generated while the remaining phase command duty is fixed to the minimum value of zero.

The pulse pattern modulation mode is configured to select one switching pulse pattern to be applied to each switching element in a plurality of prepared pulse switching patterns in accordance with, for example, the modulation factor of the inverter 62 and RPM-torque characteristics of the MG 80.

The rectangular modulation mode is configured to generate a switching pulse pattern for each switching element such that the ratio of on duration to an off duration for the corresponding switching element are set to 1:1.

Executing a selected one of the above modulation modes enables the switching pulse signals to be generated for the respective switching elements 63 to 68; each of the switching pulse signals includes a duty factor. The duty factor for a switching element represents a controllable ratio, i.e. percentage, of an on duration of the switching element to a total duration of a switching cycle. That is, the modulator 61 individually performs on-off switching operations of the switching elements 63 to 68 in accordance with the respective switching pulse signals to thereby convert the smoothed DC voltage Vdc into controlled three-phase AC voltages to be applied to the respective three-phase windings 81, 82, and 83. In particular, the modulator 61 complementarily turns on upper- and lower-arm switching elements of each pair while dead times during which the upper- and lower-arm switching elements of each pair are simultaneously turned off are ensured. Introducing the dead times prevents the upper and lower-arm switching elements of each pair from being simultaneously on, thus preventing an overcurrent from flowing through the upper- and lower-arm switching elements.

The on-off switching operations of the switching elements 63 to 68 enable output torque of the MG 80 generated based on the applied three-phase AC voltages to follow the request torque Trq.

The angular velocity calculator 86 samples the electrical angle θ from the rotational angle sensor 85, and temporally differentiates the sampled electrical angle θ to thereby calculate an electrical angular velocity ω.

The magnetic flux variation estimator 30 is configured to estimate a magnetic flux variation Δϕ that is defined as a difference of present magnetic flux of the permanent magnet unit 80a2 from standard magnetic flux $\phi_{std}$. The standard magnetic flux $\phi_{std}$ is defined as a magnetic flux of the permanent magnet unit 80a2 while the MG 80 is in a predetermined standard state. The MG 80 being in the standard state is defined as the MG 80 having a predetermined standard temperature range.

FIG. 2 shows that various parameters are input to the magnetic flux variation estimator 30; the various parameters at least include (1) The command voltages Vd* and Vq*

(2) The d- and q-axis currents Id and Iq or the command d- and q-axis currents Id* and Iq* (see dashed lines)

(3) The electrical angular velocity ω

The various parameters also include, depending on a selected configuration of correcting the voltage errors, at least one of (1) The request torque Trq* (see two-dot chain line)

(2) The inverter temperature T_inv (see two-dot chain line)

(3) The selected modulation used by the modulator 61 (see two-dot chain line)

Next, the following describes how the method disclosed in Japanese Patent Publication No. 2943657 estimates the magnetic flux of the permanent magnet unit of a motor before describing how the magnetic flux variation estimator 30 estimates the magnetic flux of the permanent magnet unit 80a2.

The relationship between d- and q-axis voltages Vd and Vq applied to the motor and the d- and q-axis currents Id and Iq flowing in the motor based on the d- and q-axis voltages Vd and Vq is usually expressed by the following voltage equations (1) using the magnetic flux:

$$Vd = -\omega \times Lq \times Iq + R \times Id$$
$$Vq = \omega \times Ld \times Id + R \times Iq + \omega \times \phi \qquad (1)$$

where:

R represents the resistance of each phase winding, referred to as a winding resistance Ld represents the inductance in the d-axis, referred to as a d-axis inductance Lq represents the inductance in the q-axis, referred to as a q-axis inductance ϕ represents the magnetic flux of the permanent magnet unit of the motor Arranging the voltage equation (1) for the magnetic flux ϕ enables the following equation (2) to be obtained:

$$\phi = \frac{Vq - \omega \times Ld \times Id - R \times Iq}{\omega} \qquad (2)$$

Like the exemplary embodiment, the standard magnetic flux $\phi_{std}$ is defined as the magnetic flux of the permanent magnet unit while the motor is in the predetermined standard state, and the magnetic flux variation Δϕ is defined as the difference of the present magnetic flux of the permanent magnet unit from the standard magnetic flux $\phi_{std}$.

Then, the magnetic flux variation Δϕ can be expressed by the following equation (3):

$$\Delta\phi = \phi - \phi_{std} = \frac{Vq - \omega \times Ld \times Id - R \times Iq - \omega \times \phi_{std}}{\omega} \qquad (3)$$

In addition, d- and q-axis voltages applied to the motor when the motor is in the standard state, i.e. the magnetic flux of the permanent magnet unit is the reference magnetic flux $\phi_{std}$, will be referred to respectively as d-axis standard voltage Vd_std and a q-axis standard voltage Vq_std. In contrast, d- and q-axis voltages actually applied to the motor will be referred to as actual d- and q-axis voltages.

They voltage equation (1) enables the q-axis standard voltage Vq_std can be expressed by the following equation (4.1):

$$Vq\_std = \omega \times \phi_{std} + \omega \times Ld \times Id + R \times Iq \qquad (4.1)$$

Let us redefine the magnetic flux variation Δϕ in the equation (3) as a magnetic flux variation estimate Δϕ$_{est}$, and also redefine the q-axis voltage Vq as a q-axis actual voltage estimate [Vq]. Then, substituting the q-axis standard voltage Vq_std into the equation (3) enables the magnetic flux variation estimate Δϕ$_{est}$ to be expressed by the following equation (4.2):

$$\Delta\phi_{est} = \frac{[Vq] - Vq_{std}}{\omega} = \frac{\Delta Vq}{\omega} \quad (4.2)$$

Note that the q-axis actual voltage estimate [Vq] represents an estimate of the actual q-axis voltage in estimation of the magnetic flux variation Δϕ.

Figure 18:
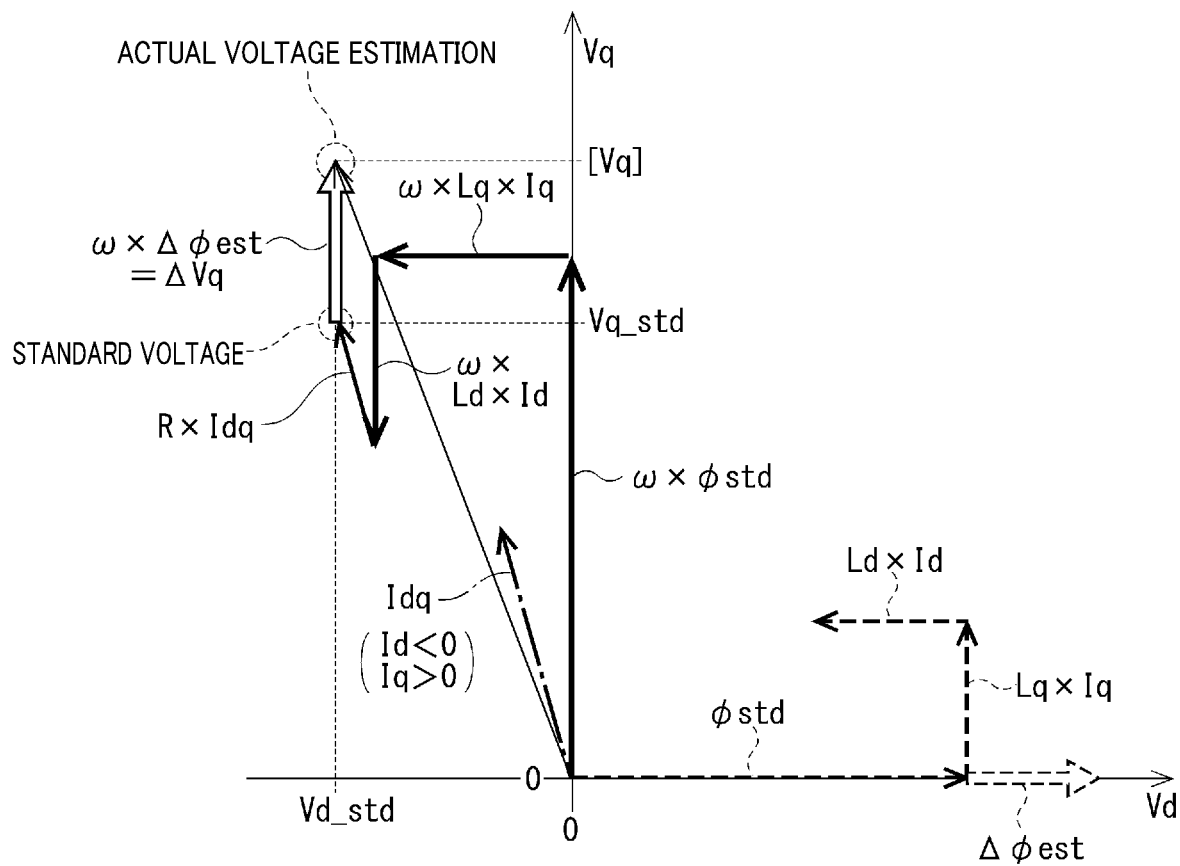
FIG. 18 is a graph schematically illustrating an example of estimation of magnetic flux.

FIG. 18 illustrates the q-axis standard voltage Vq_std expressed by the equation (4.1) and the magnetic flux variation estimate Δϕ$_{est}$ expressed by the equation (4.2) in the d-q coordinate system. The synthesis of the vector (ω×ϕ$_{std}$), the vector (ω×Ld×Id), and the vector (R×Iq), which are respectively expressed by heavy arrows, in the d-q coordinate system represents the equation (4.1), so that a q-axis component of the end point of a resultant vector based on the synthesis of the vector (ω×ϕ$_{std}$), the vector (ω×Ld× Id), and the vector (R×Iq) represents the q-axis standard voltage Vq_std. The vector (ω×Δϕ$_{est}$) in the d-q coordinate system, which is expressed by a thick white arrow, represents the equation (4.2), so that a q-axis component of the end point of the vector (ω×Δϕ$_{est}$) represents the q-axis actual voltage estimate [Vq]. Note that the vector (Δϕ$_{est}$) in voltage-time dimensions, to which the electrical angular velocity ω has not been multiplied yet, can be expressed by a dashed arrow.

Note that a usual method for obtaining the q-axis actual voltage estimate uses a voltage sensor for measuring the q-axis actual voltage.

In contrast, the magnetic flux variation estimator 30 according to the exemplary embodiment is configured to calculate, based on the q-axis command voltage Vq*, the q-axis actual voltage estimate [Vq] without using voltage sensors. This aims to reduce the component cost of the MG control apparatus 20, and the installation space of the MG control apparatus 20 in the hybrid vehicle.

The inventor of this application focuses on the fact that a q-axis voltage error Vq_err has occurred between the q-axis command voltage Vq* and the q-axis actual voltage due to various factors described later. When the q-axis actual voltage estimate [Vq] is expressed by the sum of the q-axis command voltage Vq* and the q-axis voltage error Vq_err, the above equation (4.2) can be rewritten as the following equation (5.1):

$$\Delta\phi_{est} = \frac{(Vq^* + Vq\_err) - Vq\_std}{\omega} \quad (5.1)$$

Dividing the q-axis voltage error Vq_err by the electrical angular velocity ω enables an estimation error Δϕ$_{est\_err}$ to be obtained, which is expressed by the following equation (5.2):

$$\Delta\phi_{est\_err} = \Delta\phi_{est} - \Delta\phi = \frac{Vq\_err}{\omega} \quad (5.2)$$

From this viewpoint, the magnetic flux variation estimator 30 according to the exemplary embodiment is configured to perform a two-step approach to thereby improve the estimation accuracy of the magnetic flux variation Δϕ.

The two-step approach includes a first step of correcting a d-axis voltage error Vd_err between the d-axis command voltage Vd* and the d-axis actual voltage, and a q-axis voltage error Vq_err between the q-axis command voltage Vq* and the q-axis actual voltage to thereby calculate corrected B- and q-axis command voltages Vd and Vq, resulting in a reduction of each of the d- and q-axis voltage errors Vd_err and the Vq_err. Specifically, the d- and q-axis voltage errors are due to dead times of the switching elements 63 to 68, and a DC voltage drop across each of the switching elements 63-68.

The two-step approach also includes a second step of estimating the magnetic flux variation Δϕ in accordance with both the corrected d- and q-axis command voltages Vd and Vq; the second step is different from the estimation method of the published patent document, which estimates the magnetic flux variation Δϕ in accordance with the q-axis actual voltage.

Specifically, the second step calculates the ratio of the corrected q-axis command voltage Vq to the corrected d-axis command voltage Vd, and multiplies, by the ratio of the corrected q-axis command voltage Vq to the corrected d-axis command voltage Vd, the d-axis standard voltage Vd_std, thus calculating the q-axis actual voltage estimate [Vq]. Then, the second step subtracts the q-axis standard voltage Vq_std from the q-axis actual voltage estimate [Vq] to thereby calculate a q-axis voltage deviation ΔVq, and divides the q-axis voltage deviation ΔVq by the electrical angular velocity ω, thus calculating the magnetic flux variation estimate Δϕ$_{est}$ (see the following equation (6)):

$$\Delta\phi_{est} = \frac{\frac{Vq^{}}{Vd^{}} \times Vd\_std - Vq\_std}{\omega} \quad (6)$$

The detail of the second step will be described later. The second step results in reduction of adverse effects on the magnetic flux variation estimate Δϕ$_{est}$; these adverse effects are due to voltage errors remaining in the corrected d- and q-axis command voltages Vd and Vq obtained by the first step.

Figure 3:
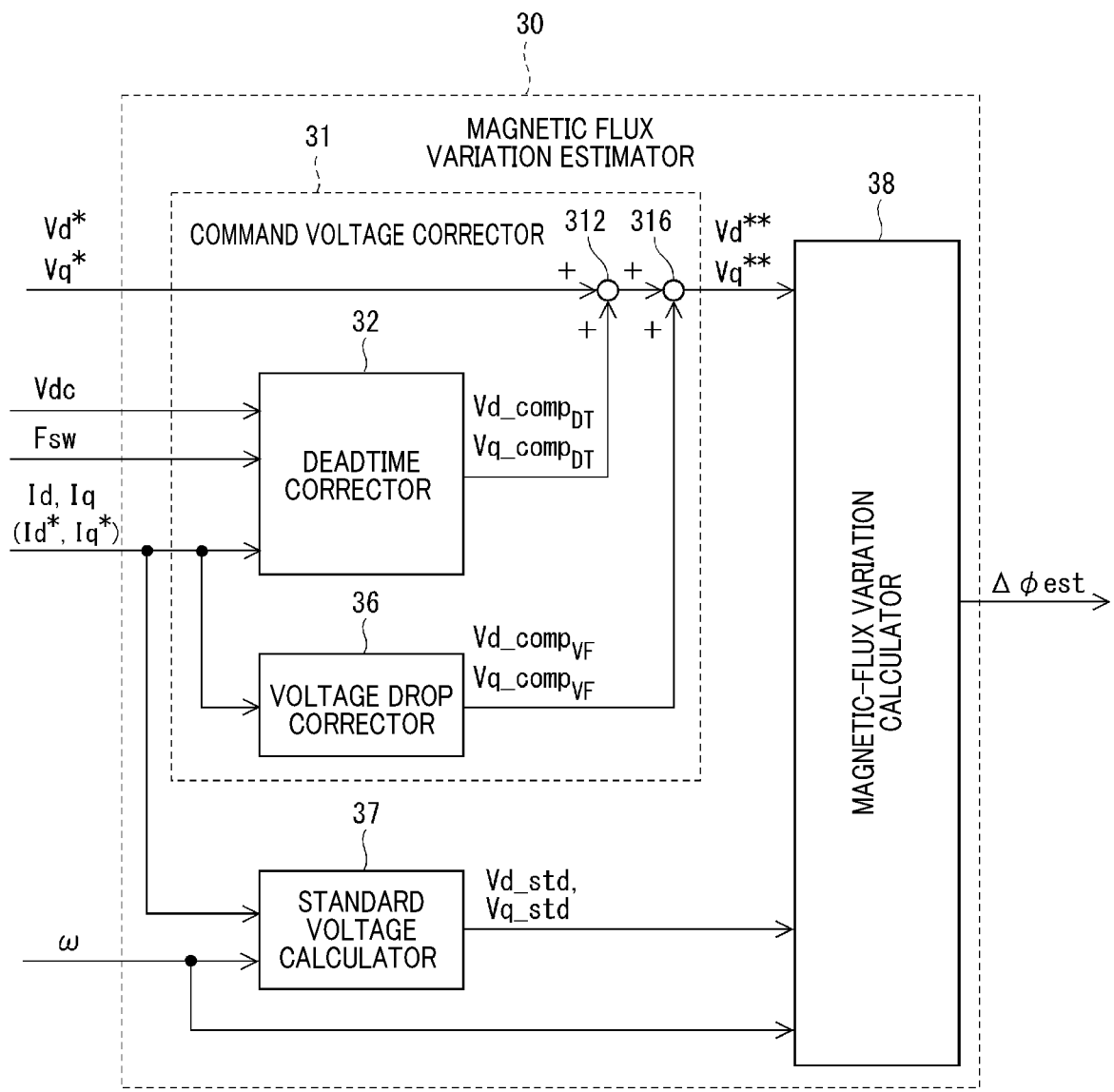
FIG. 3 is a block diagram schematically illustrating a magnetic flux variation estimator illustrated in FIG. 2.

Next, the following describes a schematic configuration of the magnetic flux variation estimator 30 with reference to FIG. 3.

The magnetic flux variation estimator 30 includes a command voltage corrector 31, a standard voltage calculator 37, and an estimation calculator 38.

The command voltage corrector 31 is configured to correct the d-axis command voltage Vd* and the q-axis command voltage Vq* to thereby reduce the d-axis voltage error Vd_err between the d-axis command voltage Vd* and the d-axis actual voltage, and the q-axis voltage error Vq_err between the q-axis command voltage Vq* and the q-axis actual voltage, thus outputting the corrected d- and q-axis command voltages Vd and Vq.

For example, the command voltage corrector 31 includes a deadtime corrector 32, a voltage drop corrector 36, an adder 312, and an adder 316.

Specifically, a switching frequency Fsw of the switching elements 63 to 68 is input from the modulator 61 to the deadtime corrector 32, and the DC voltage Vdc is also input to the deadtime corrector 32. In addition, the d- and q-axis currents Id and Iq or the command d- and q-axis currents Id* and Iq* are input from the dq converter 29 or the command current calculator 21 to the deadtime corrector 32.

Then, the deadtime corrector 32 corrects, based on the input parameters, the d-axis voltage error Vd_err between the d-axis command voltage Vd* and the d-axis actual voltage, and the q-axis voltage error Vq_err between the q-axis command voltage Vq* and the q-axis actual voltage due to the deadtimes of the respective switching elements 63 to 68, thus outputting d- and q-axis deadtime correction voltages Vd_comp$_{DT}$ and Vq_comp$_{DT}$.

The d- and q-axis currents Id and Iq or the command d- and q-axis currents Id* and Iq* are input from the dq converter 29 or the command current calculator 21 to the voltage drop corrector 36.

Then, the voltage drop corrector 36 corrects, based on the input parameters, the d-axis voltage error Vd_err between the d-axis command voltage Vd* and the d-axis actual voltage, and the q-axis voltage error Vq_err between the q-axis command voltage Vq* and the q-axis actual voltage due to the DC voltage drops across the respective switching elements 63 to 68, thus outputting d- and q-axis voltage-drop correction voltages Vd_comp$_{VF}$ and Vq_comp$_{VF}$.

The adder 312 adds the d- and q-axis deadtime correction voltages Vd_comp$_{DT}$ and Vq_comp$_{DT}$ to the respective d- and q-axis command voltages Vd* and Vq*.

The adder 316 adds the d- and q-axis voltage-drop correction voltages Vd_comp$_{VF}$ and Vq_comp$_{VF}$ to the respective d- and q-axis command voltages Vd* and Vq* to which the d- and q-axis deadtime correction voltages Vd_comp$_{DT}$ and Vq_comp$_{DT}$ have been respectively added, thus outputting the corrected d- and q-axis command voltages Vd and Vq.

To the standard voltage calculator 37, the angular velocity ω of the MG 80, the d- and q-axis currents Id and Iq or the command d- and q-axis currents Id* and Iq* are input from the dq converter 29 or the command current calculator 21. Then, the standard voltage calculator 37 calculates, based on the angular velocity ω, and the d- and q-axis currents Id and Iq or the command d- and q-axis currents Id* and Iq*, the d- and q-axis standard voltages Vd_std and Vq_std that are applied to the MG 80 being in the standard state.

The estimation calculator 38 calculates the ratio of the corrected q-axis command voltage Vq to the corrected d-axis command voltage Vd, and multiplies, by the ratio of the corrected q-axis command voltage Vq to the corrected d-axis command voltage Vd, the d-axis standard voltage Vd_std, thus calculating the q-axis actual voltage estimate [Vq]. Then, the estimation calculator 38 subtracts the q-axis standard voltage Vq_std from the q-axis actual voltage estimate [Vq] to thereby calculate the q-axis voltage deviation ΔVq, and divides the q-axis voltage deviation ΔVq by the electrical angular velocity ω, thus calculating the magnetic flux variation estimate $\Delta\phi_{est}$.

Next, the following describes the detailed structure of each component of the magnetic flux variation estimator 30. First, the following describes the deadtime corrector 32 with reference to FIGS. 4 to 10, and thereafter describes the voltage drop corrector 36 with reference to FIGS. 11 to 13.

The deadtime corrector 32 corrects the d-axis voltage error Vd_err between the d-axis command voltage Vd* and the d-axis actual voltage, and the q-axis voltage error Vq_err between the q-axis command voltage Vq* and the q-axis actual voltage due to the deadtimes of the respective switching elements 63 to 68. The deadtimes each represent a period during which the upper- and lower-arm switching elements of each phase are simultaneously turned off. Although the detailed descriptions of the deadtimes are omitted because the deadtimes are well-known technologies, the following simply describes the deadtimes with reference to FIGS. 4A and 4B.

Figure 4A:
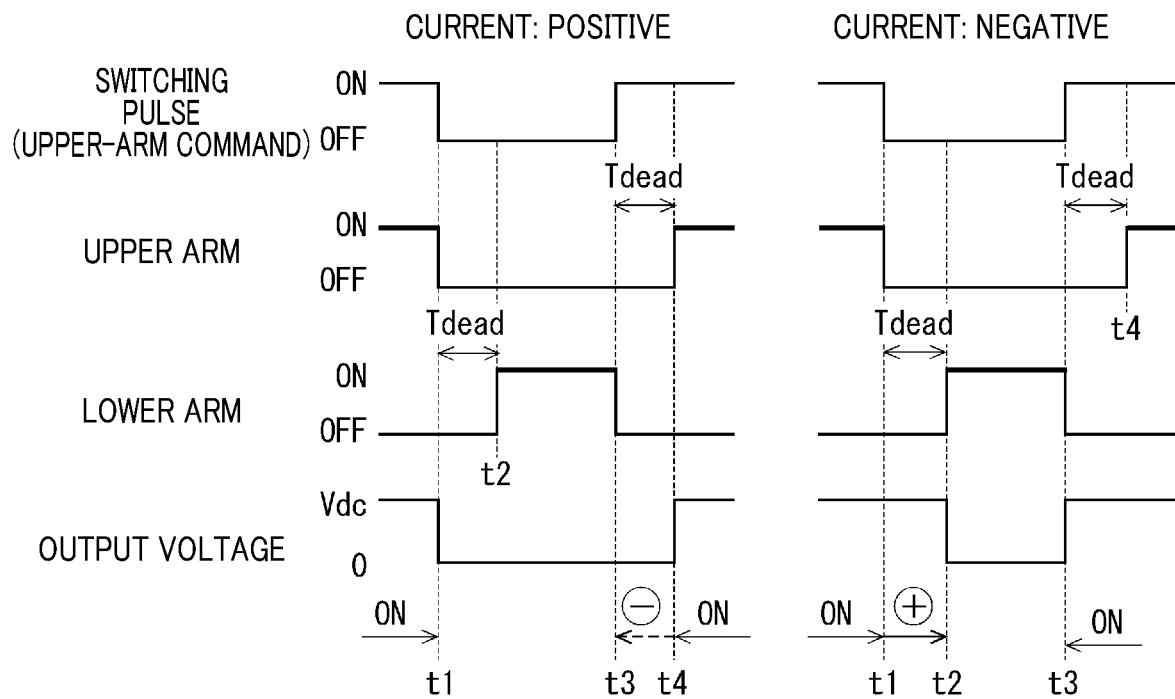
FIG. 4A is a joint timing chart schematically illustrating how upper- and lower-arm switching elements for a selected phase are driven based on a switching pulse according to the exemplary embodiment.

FIG. 4A illustrates that a switching pulse is output from the modulator 61 as an upper-arm command to the target upper-arm switching element of a selected phase. Note that FIG. 4A focuses on the selected phase of the inverter 62 between the battery 10 and the load (MG) 80 for simple description of the deadtimes.

The switching pulse is controlled to fall down at time t1, and thereafter rises up at time t3, so that the target upper-arm switching element is turned off at the time t1, and thereafter turned on at time t4 when a deadtime Tdead has elapsed since the time t3. The target lower-arm switching element of the selected phase is turned on at time t2 when the deadtime Tdead has elapsed since the time t1, and thereafter turned off at the time t3.

When a current is flowing through the target upper-arm switching element in a positive direction from the collector to the emitter, the output voltage of the inverter 62 becomes the DC voltage Vdc upon the upper-arm switching element being turned on, and becomes zero upon the upper-arm being turned off. This results in the zero-voltage period of the output voltage from the time t3 to the time t4 being added to the normal zero-volt period of the output voltage corresponding to the off period of the switching pulse. In addition, when a current is flowing through the target lower-arm switching element in a negative direction from the emitter to the collector, the output voltage of the inverter 62 becomes the DC voltage Vdc upon the target lower-arm switching element being turned off, and becomes zero upon the lower-arm being turned on. This results in the Vdc period of the output voltage from the time t1 to the time t2 being added to the normal Vdc period of the output voltage corresponding to the on period of the switching pulse.

Figure 4B:
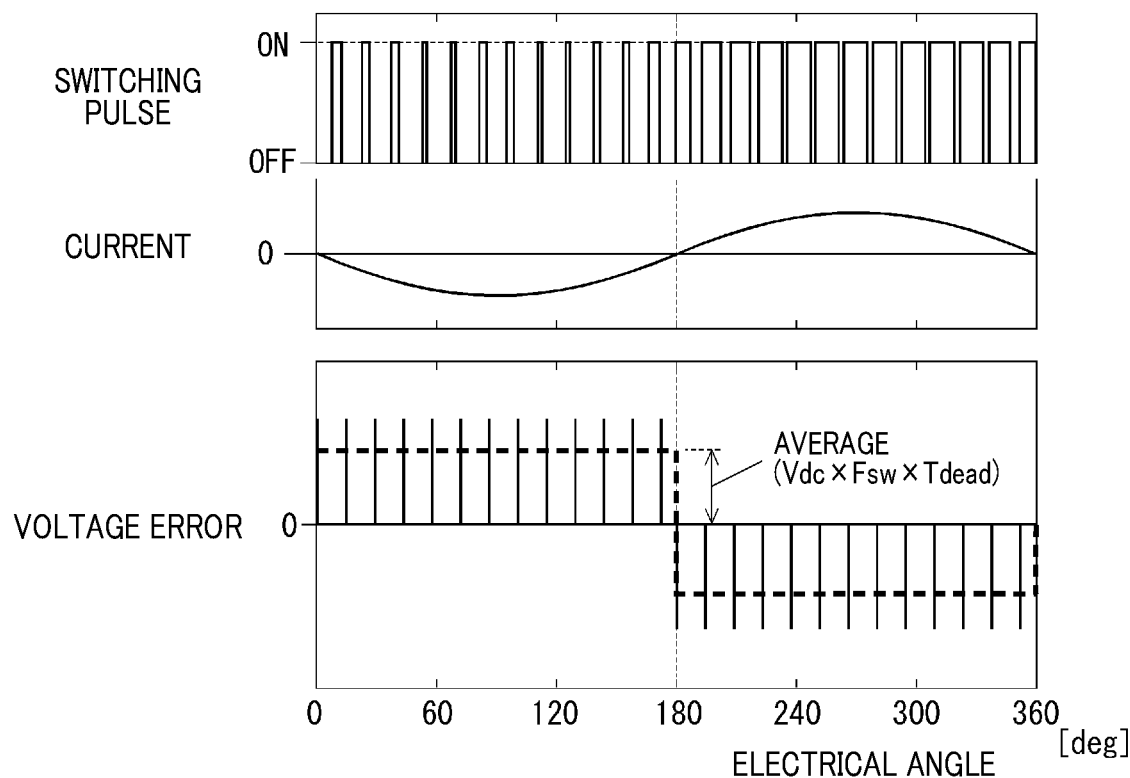
FIG. 4B is a joint timing chart schematically illustrating an example of the relationships among the switching pulse for a selected phase, a phase current of the selected phase, and d- and q-axis voltage errors due to respective dead times during a three-phase modulation mode in PWM control according to the exemplary embodiment.

FIG. 4B schematically illustrates the relationships among the switching pulse for a selected phase, a phase current of the selected phase, and the d- and q-axis voltage errors due to the respective dead times during the three-phase modulation mode in the PWM control. A rectangular wave signal based on the average of the voltage errors is illustrated by a dashed line, and the rectangular waveform signal, which will be referred to as a voltage error signal, has an amplitude A determined based on the product of the DC voltage Vdc input to the inverter 62, the switching frequency Fsw, and the dead time Tdead, which is expressed by the equation "A=Vdc×Fsw×Tdead".

In addition, when the modulator 61 performs the three-phase modulation mode in the PWM control, the d- and q-axis deadtime correction voltages Vd_comp$_{DT}$ and Vq_comp$_{DT}$ can be expressed, based on a current phase βd of a current vector Idq relative to the d-axis (see FIG. 18) by the following equations (7):

$$\text{Vd\_comp}_{DT} = -Vdc \times Fsw \times Tdead \times \frac{2\sqrt{6}}{\pi} \cdot \cos(\beta d) \quad (7)$$

$$\text{Vq\_comp}_{DT} = -Vdc \times Fsw \times Tdead \times \frac{2\sqrt{6}}{\pi} \cdot \sin(\beta d)$$

The value of the right side of the equation (7) for the d-axis deadtime correction voltage Vd_comp$_{DT}$ in the time dimension, to which the value (Vdc×Fsw) has not been multiplied yet, is expressed as a d-axis contribution time Td_ctrb, and the value of the right side of the equation (7) for the q-axis deadtime correction voltage Vq_comp$_{DT}$ in the time dimension, to which the value (Vdc×Fsw) has not been multiplied yet, is expressed as a q-axis contribution time Tq_ctrb. These d- and q-axis contribution times Td_ctrb and Tq_ctrb are expressed by the following equations (8.1):

$$\text{Td\_com}_{DT} = -Tdead \times \frac{2\sqrt{6}}{\pi} \cdot \cos(\beta d) \quad (8.1)$$

$$\text{Tq\_com}_{DT} = -Tdead \times \frac{2\sqrt{6}}{\pi} \cdot \sin(\beta d)$$

Using the d- and q-axis contribution times Td_ctrb and Tq_ctrb enables the equations (7) to be rewritten into the following equations (8.2):

$$Vd\_com_{DT} = Vdc \times Fsw \times Td\_com_{DT}$$

$$Vq\_com_{DT} = -Vdc \times Fsw \times Tq\_com_{DT} \quad (8.2)$$

Figure 5:
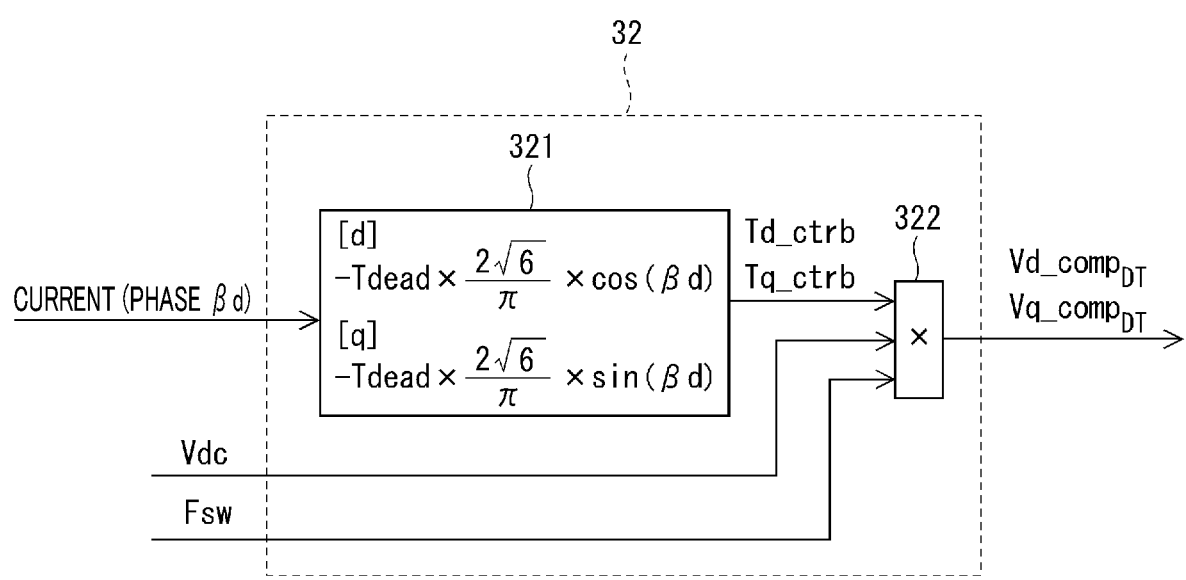
FIG. 5 is a block diagram schematically illustrating an example of how a deadtime corrector is implemented in a magnetic flux variation estimator illustrated in FIG. 2.

FIG. 5 is a block diagram schematically illustrating an example of how the deadtime corrector 32 is implemented in the magnetic flux variation estimator 30.

Specifically, the deadtime corrector 32 implemented in the magnetic flux variation estimator 30 includes a deadtime correction map 321 and a multiplier 322. The deadtime correction map 321 is designed as, for example, a function that calculates, based on the current phase βd as an argument thereto, the d- and q-axis contribution times Td_ctrb and Tq_ctrb expressed by the above equations (8.1).

The multiplier 322 multiplies, by the DC voltage Vdc and the switching frequency Fw, each of the d- and q-axis contribution times Td_ctrb and Tq_ctrb output from the deadtime correction map 321, thus outputting the corresponding one of the d- and q-axis deadtime correction voltages Vd_comp$_{DT}$ and Vq_comp$_{DT}$. Because the current phase βd can be calculated based on the d- and q-axis currents Id and Iq, the d- and q-axis currents Id and Iq can be input to the deadtime correction map 321 as arguments thereto in place of the current phase βd. Similarly, the d- and q-axis command currents Id* and Iq* can be input to the deadtime correction map 321 as arguments thereto in place of the current phase βd if the d- and q-axis command currents Id* and Iq* are close to the respective d- and q-axis currents Id and Iq. If the d- and q-axis command currents Id* and Iq* are uniquely determined based on the request torque Trq*, the request torque Trq* can be input to the deadtime correction map 321 as an argument thereto in place of the current phase βd.

Figure 6:
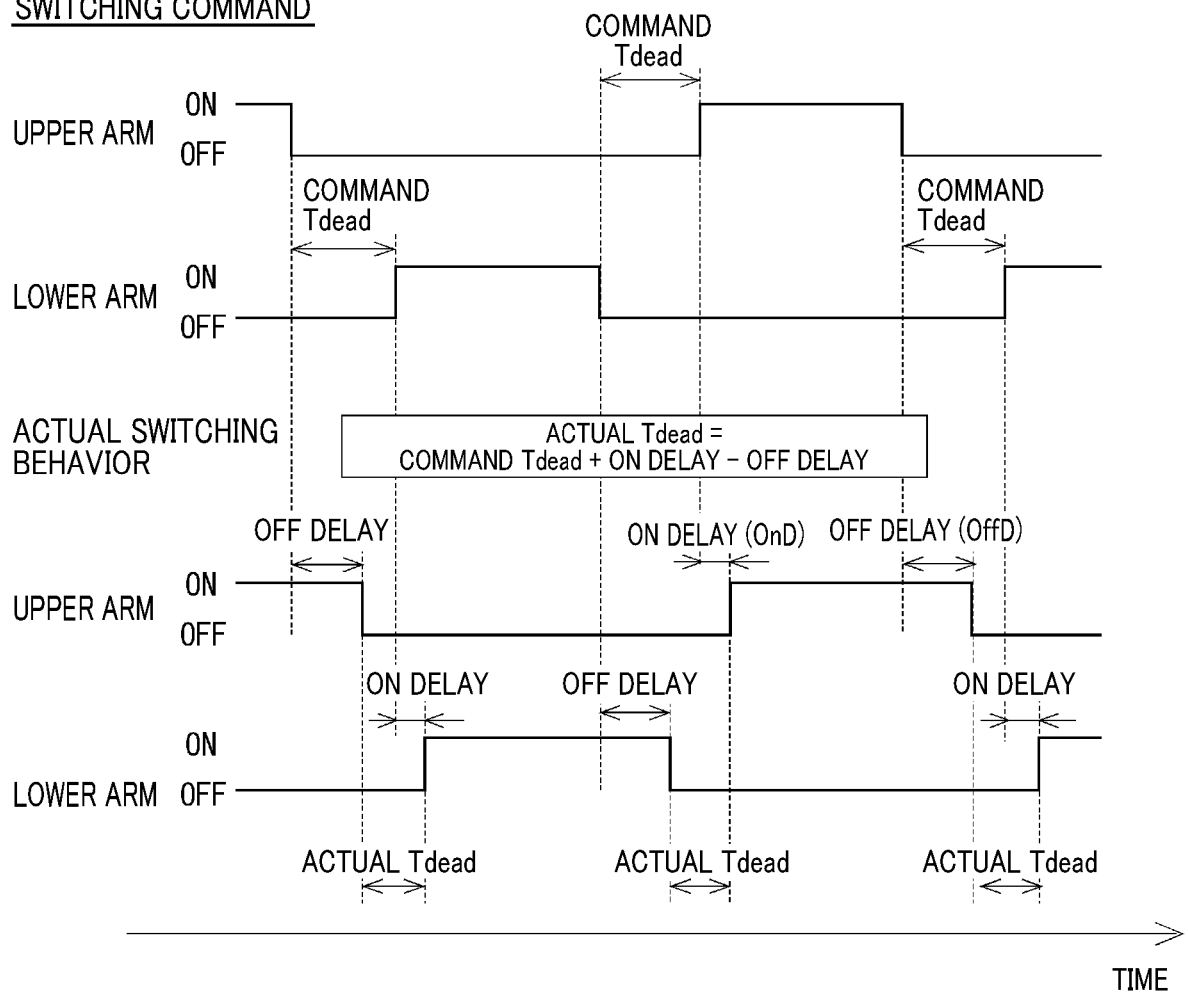
FIG. 6 is a joint timing chart schematically illustrating how switching pulses for a target pair of target upper- and lower-arm switching elements are changed over time, and how the target upper- and lower-arm switching elements are driven according to the exemplary embodiment.

FIG. 6 schematically illustrates how switching pulses for a target pair of target upper- and lower-arm switching elements are changed over time, and how the target upper- and lower-arm switching elements are driven.

As illustrated in FIG. 6, there is a deadtime between the rising timing of the on command of the switching pulse for the target upper-arm switching element and the falling timing of the on command for the target lower-arm switching element. In addition, there is a deadtime between the rising timing of the on command of the switching pulse for the target lower-arm switching element and the falling timing of the on command for the target upper-arm switching element. These deadtimes between the on commands of the switching pulses will be referred to as command deadtimes COM Tdead.

As illustrated in FIG. 6, there are delays in on and off timings of the target upper-arm switching element, and also there are delays in on and off timings of the target lower-arm switching element. The on delay, i.e. the rising delay, OnD of each switching element 63 to 68 is defined as time required for the collector-emitter voltage Vce of the switching element to have risen up to 50% of the maximum level of the collector-emitter voltage Vce since the on timing of a corresponding switching pulse. Similarly, the off delay, i.e. the falling delay, OffD of each switching element 63 to 68 is defined as time required for the collector-emitter voltage Vce of the switching element to have fallen down to 50% of the maximum level of the collector-emitter voltage Vce since the off timing of a corresponding switching pulse.

These definitions enable an actual deadtime ACT Tdead based on a corresponding command deadtime COM Tdead to be expressed by the following equation (9):

$$\text{ACT } T\text{dead} = \text{COM } T\text{dead} + \text{On}D - \text{Off}D \quad (9)$$

The on delay OnD and off delay OffD for each switching element 63-68 change depending on the amplitude of a current flowing through the corresponding switching element. If each command deadtime COM Tdead for a target switching element in the switching elements 63-68 is set to a fixed value, and an increase in the ON delay OnD for the target switching element with an increase of the current amplitude is greater than an increase in the off delay OffD for the target switching element with the same increase of the current amplitude, the actual deadtimes ACT Tdead for the target switching element increase with an increase of the current amplitude of the target switching element (see FIG. 7A). For this reason, the amplitude of a current flowing through any of the switching elements 63-68 can be used as an argument to the deadtime correction map 321 in addition to the current phase βd.

Figure 7A:
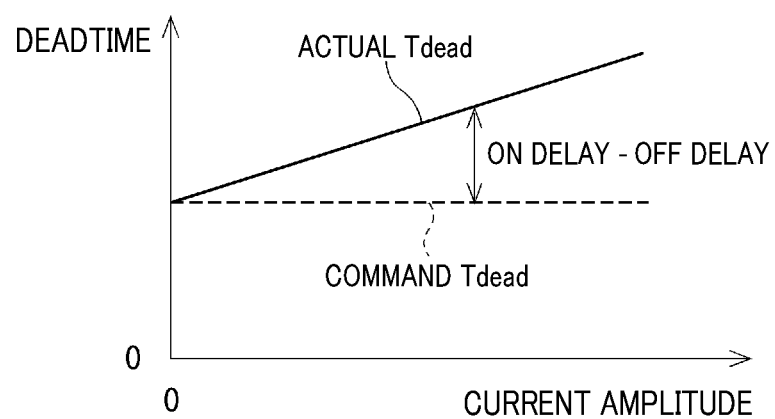
FIG. 7A is a graph schematically illustrating a relationship between an actual deadtime and a command deadtime according to the exemplary embodiment.
Figure 7B:
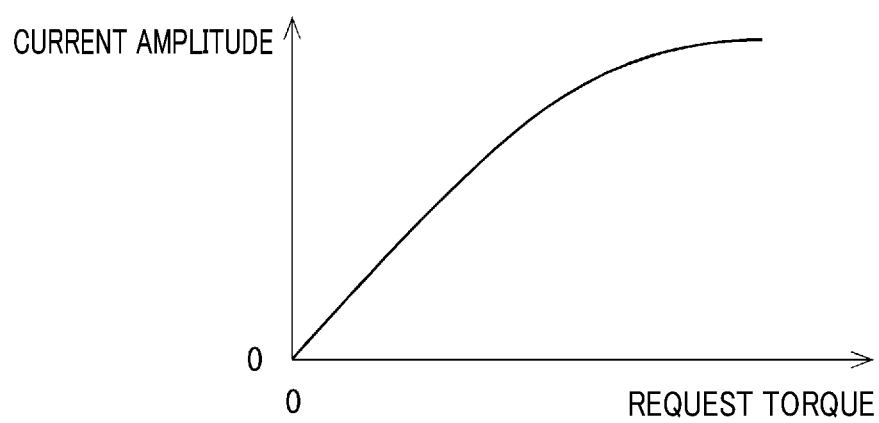
FIG. 7B is a graph schematically illustrating a relationship between a current amplitude of a target switching element and request torque according to the exemplary embodiment.

FIG. 7B schematically illustrates that the current amplitude of a target switching element usually has a positive correlation with the request torque Trq*. If the current amplitude of a target switching element is uniquely determined based on the request torque Trq*, the request torque Trq* can be used as an argument to the deadtime correction map 321 in addition to the current phase βd.

That is, the deadtime corrector 32 can be configured to change the amplitude of each of the d- and Iq-axis deadtime correction voltages Vd_comp$_{DT}$ and Vq_comp$_{DT}$ in accordance with change of the current amplitude of a selected one of the switching elements 63-68 and/or the request torque Trq*. This results in a higher accuracy of deadtime correction of the d- and q-axis command voltages Vd* and Vq*.

Figure 8A:
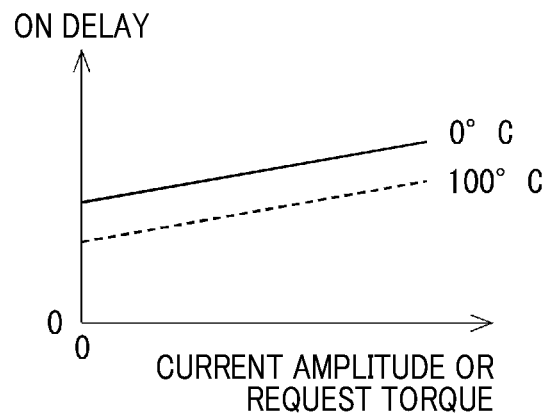
FIG. 8A is a graph schematically illustrating temperature characteristics of an on delay relative to either a current amplitude of the switching element or request torque according to the exemplary embodiment.
Figure 8B:
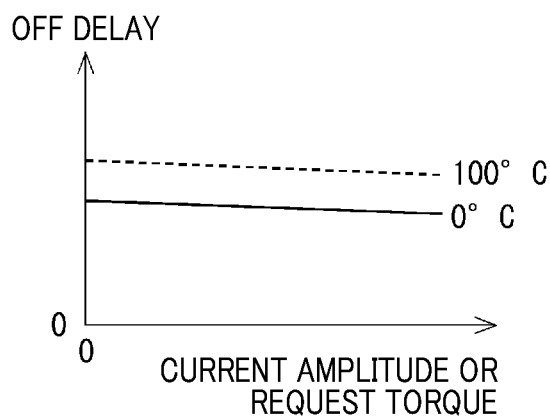
FIG. 8B is a graph schematically illustrating temperature characteristics of an off delay relative to either a current amplitude of the switching element or request torque according to the exemplary embodiment.

The on delay OnD and off delay OffD for each switching element 63-68 also change depending on the temperature of the corresponding switching element, i.e. the inverter temperature T_inv measured by the temperature sensor 76 (see FIGS. 8A and 8B). Specifically, the on delay OnD for each switching element 63-68 at the inverter temperature T_inv of 100° C. at any current amplitude or torque request Trq* is smaller than the on delay OnD for the corresponding switching element 63-68 at the inverter temperature T_inv of 0° C. at the same current amplitude or torque request Trq*. Similarly, the off delay OffD for each switching element 63-68 at the inverter temperature T_inv of 100° C. at any current amplitude or torque request Trq* is larger than the on delay OnD for the corresponding switching element 63-68 at the inverter temperature T_inv of 0° C. at the same current amplitude or torque request Trq*. In addition, the dependency of the on delay OnD for each switching element 63-68 on the inverter temperature T_inv is larger than the dependency of the off delay OffD for the corresponding switching element 63-68 on the inverter temperature T_inv.

Figure 8C:
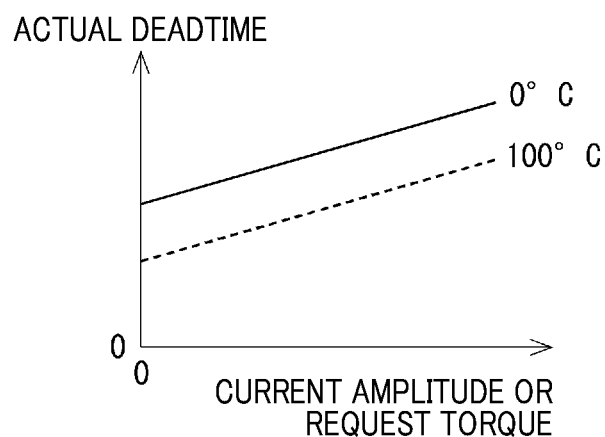
FIG. 8C is a graph schematically illustrating temperature characteristics of an actual deadtime for each switching element relative to either a current amplitude of the switching element or request torque according to the exemplary embodiment.

How the actual deadtime ACT Tdead for each switching element 63-68, which is expressed by the above equation (9), is changed with change of the inverter temperature T_inv is illustrated in FIG. 8C, which is the combination of FIGS. 8A and 8B. As illustrated in FIG. 8C, the actual deadtime ACT Tdead for each switching element 63-68 at the inverter temperature T_inv of 100° C. at any current amplitude or torque request Trq* is smaller than the actual deadtime ACT Tdead for the corresponding switching element 63-68 at the inverter temperature T_inv of 0° C. at the same current amplitude or torque request Trq*. For this reason, the inverter temperature T_inv can be used as an argument to the deadtime correction map 321 in addition to the current phase βd.

Alternatively, the deadtime correction map 321 can be configured to correct each of the d- and q-axis contribution times Td_ctrb and Tq_ctrb in accordance with the inverter temperature T_inv.

That is, the deadtime corrector 32 can be configured to change the amplitude of each of the d- and q-axis deadtime correction voltages Vd_comp$_{DT}$ and Vq_comp$_{DT}$ in accordance with change of the inverter temperature T_inv. This results in a higher accuracy of deadtime correction of the d- and q-axis command voltages Vd* and Vq*.

If the current amplitude of any of the switching elements 63-68 or the request torque Trq* is used as an argument to the deadtime correction map 321 in addition to the current phase βd without using the inverter temperature T_inv, each of the d- and q-axis deadtime correction voltages Vd_comp$_{DT}$ and Vq_comp$_{DT}$ can be determined based on one of (1) The temperature characteristic curve of the actual deadtime ACT Tdead at the inverter temperature T_inv of 100° C.

(2) The temperature characteristic curve of the actual deadtime ACT Tdead at the inverter temperature T_inv of 0° C.

(3) The average temperature characteristic curve of the temperature characteristic curve of the actual deadtime ACT Tdead at the inverter temperature T_inv of 100° C. and the temperature characteristic curve of the actual deadtime ACT Tdead at the inverter temperature T_inv of 0° C.

Figure 9A:
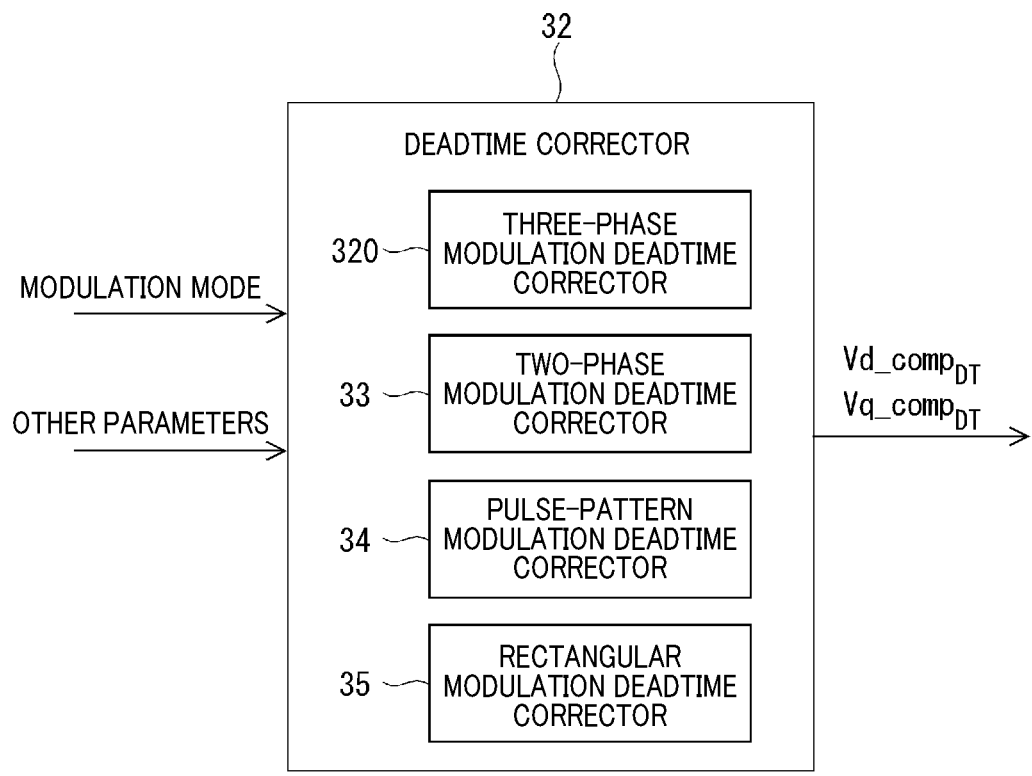
FIG. 9A is a block diagram schematically illustrating an additional example of how the deadtime corrector is implemented in the magnetic flux variation estimator illustrated in FIG. 2.

FIG. 9A is a block diagram schematically illustrating an additional example of how the deadtime corrector 32 is implemented in the magnetic flux variation estimator 30 illustrated in FIG. 2. The deadtime corrector 32 illustrated in FIG. 9A changes each of the d- and q-axis deadtime correction voltages Vd_comp$_{DT}$ and Vq_comp$_{DT}$ in accordance with any one of the modulation modes for the inverter 62 selectively carried out by the modulator 61 and other information items input thereto. The additional example of the deadtime corrector 32 will be referred to as a deadtime corrector 32A.

The deadtime corrector 32A includes a three-phase modulation deadtime corrector 320, a two-phase modulation deadtime corrector 33, a pulse-pattern modulation deadtime corrector 34, and a rectangular modulation deadtime corrector 35. The deadtime corrector 32A can include another modulation deadtime corrector if the modulator 61 uses another modulation.

The above equation (7) is established with high accuracy if the number of switching operations of each switching element is sufficiently large during one cycle of 360 electrical degrees of the MG 80 or the switching frequency Fsw is set to be constant, but is not established with high accuracy neither the number of switching operations of each switching element is sufficiently large during one cycle of 360 electrical degrees of the MG 80 nor the switching frequency Fsw is set to be constant.

If the modulator 61 performs the three-phase modulation mode, the above equation (7) is basically established with high accuracy, making it possible to correct the d- and q-axis command voltages Vd* and Vq* with high accuracy. In contrast, if the modulator 61 performs another modulation, the above equation (7) may not be established with high accuracy, resulting in reduction of the accuracy of correcting the d- and q-axis voltage errors.

From this viewpoint, the deadtime corrector 32A is configured to change each of the d- and q-axis deadtime correction voltages Vd_comp$_{DT}$ and Vq_comp$_{DT}$ in accordance with any one of the modulation modes for the inverter 62 selectively carried out by the modulator 61, which aims to increase the accuracy of correcting the d- and q-axis command voltages Vd* and Vq*.

Figure 9B:
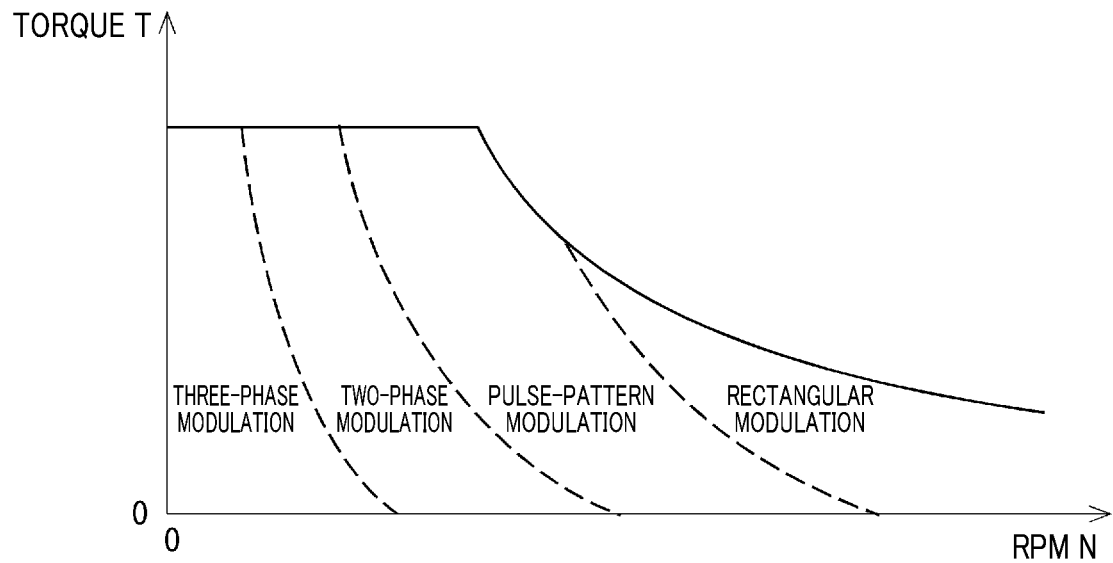
FIG. 9B is a graph schematically illustrating four regions in RPM-torque characteristics of an MG illustrated in FIG. 1; the four regions are previously determined to be suitable for the respective three-phase modulation mode, two-phase modulation mode, pulse pattern modulation mode, and rectangular modulation mode.

FIG. 9B illustrates four regions in the RPM-torque characteristics of the MG 80; the four regions are previously determined to be suitable for the respective three-phase modulation mode, two-phase modulation mode, pulse pattern modulation mode, and rectangular modulation mode. That is, the modulator 61 is for example configured to sequentially perform the three-phase modulation mode, two-phase modulation mode, pulse pattern modulation mode, and rectangular modulation mode in this order as the RPM N of the MG 80 increases from zero.

The three-phase modulation deadtime corrector 32 has the same configuration as the configuration of the deadtime corrector 32 illustrated in FIG. 5, so that the three-phase modulation deadtime corrector 32 is configured to calculate the d- and q-axis deadtime correction voltages Vd_comp$_{DT}$ and Vq_comp$_{DT}$ in accordance with the above equations (7).

The two-phase modulation mode may cause the amplitude and phase of each of the d- and q-axis voltage errors due to the respective dead times to change depending on, for example, a power factor of the inverter 62 in addition to the DC voltage Vdc, the switching frequency Fsw, and the current phase βd. For this reason, mapping the relationships among the amplitude and phase of each of the d- and q-axis voltage errors, and the parameters including the power factor and the current phase βd enables the d- and q-axis deadtime correction voltages Vd_comp$_{DT}$ and Vq_comp$_{DT}$ to be calculated.

Figure 10A:
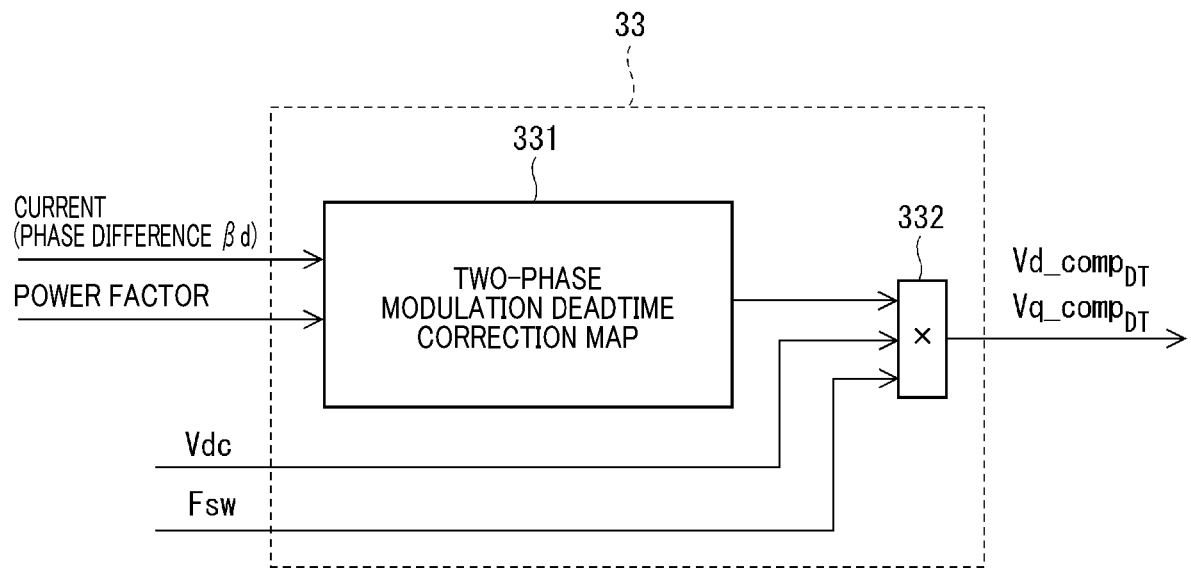
FIG. 10A is a block diagram schematically illustrating an example of how a two-phase modulation deadtime corrector is implemented in the magnetic flux variation estimator illustrated in FIG. 2.

FIG. 10A is a block diagram schematically illustrating an example of how the two-phase modulation deadtime corrector 33 is implemented in the magnetic flux variation estimator 30.

Specifically, the two-phase modulation deadtime corrector 33 includes a two-phase modulation deadtime correction map 331 and a multiplier 332. The two-phase modulation deadtime correction map 331 is designed as, for example, a function that calculates, based on the current phase βd and the power factor as arguments thereto, the d- and q-axis contribution times Td_ctrb and Tq_ctrb.

The multiplier 332 multiplies, by the DC voltage Vdc and the switching frequency Fw, each of the d- and q-axis contribution times Td_ctrb and Tq_ctrb output from the deadtime correction map 331, thus outputting the corresponding one of the d- and q-axis deadtime correction voltages Vd_comp$_{DT}$ and Vq_comp$_{DT}$.

The phase of each of the d- and q-axis deadtime correction voltages Vd_comp$_{DT}$ and Vq_comp$_{DT}$ output from the two-phase modulation deadtime corrector 33 is corrected, by a value determined based on the power factor, relative to the phase of the corresponding one of the d- and q-axis deadtime correction voltages Vd_comp$_{DT}$ and Vq_comp$_{DT}$ output from the three-phase modulation deadtime corrector 320.

The amplitude of each of the d- and q-axis deadtime correction voltages Vd_comp$_{DT}$ and Vq_comp$_{DT}$ output from the two-phase modulation deadtime corrector 33 is corrected, by a value determined based on the power factor, relative to the amplitude of the corresponding one of the d- and q-axis deadtime correction voltages Vd_comp$_{DT}$ and Vq_comp$_{DT}$ output from the three-phase modulation deadtime corrector 320.

Note that the correction value for the phase of each of the d- and q-axis deadtime correction voltages Vd_comp$_{DT}$ and Vq_comp$_{DT}$ can be simulated or measured to be implemented in the map 331.

The pulse pattern modulation mode may cause the amplitude and phase of each of the d- and q-axis voltage errors due to the respective dead times to change depending on, for example, the selected switching pulse pattern and the power factor of the inverter 62 in addition to the DC voltage Vdc, the switching frequency Fsw, and the current phase βd. For this reason, mapping the relationships among the amplitude and phase of each of the d- and q-axis voltage errors, and the parameters including the power factor, the prepared switching pulse patterns, and the current phase βd enables the d- and q-axis deadtime correction voltages Vd_comp$_{DT}$ and Vq_comp$_{DT}$ to be calculated.

Figure 10B:
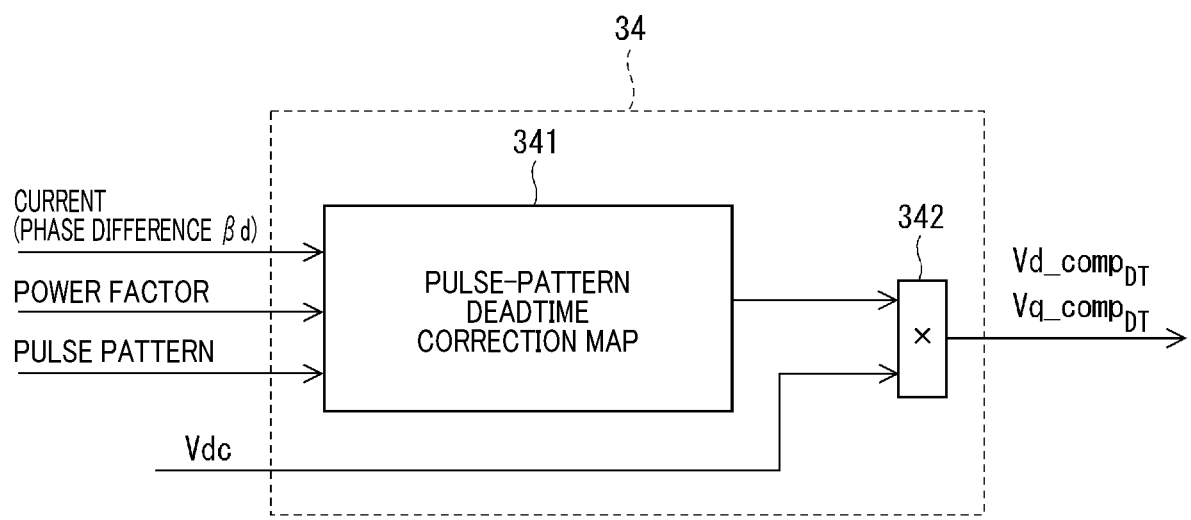
FIG. 10B is a block diagram schematically illustrating an example of how a pulse pattern modulation deadtime corrector is implemented in the magnetic flux variation estimator illustrated in FIG. 2.

FIG. 10B is a block diagram schematically illustrating an example of how the pulse pattern modulation deadtime corrector 34 is implemented in the magnetic flux variation estimator 30.

Specifically, the pulse pattern modulation deadtime corrector 34 includes a pulse pattern modulation deadtime correction map 341 and a multiplier 342. The pulse pattern modulation deadtime correction map 341 is designed as, for example, a function that calculates, based on the current phase βd, the power factor, and the selected switching pulse pattern as arguments thereto, the d- and q-axis contribution times Td_ctrb and Tq_ctrb.

The multiplier 333 multiplies, by the DC voltage Vdc and the switching frequency Fw, each of the d- and q-axis contribution times Td_ctrb and Tq_ctrb output from the deadtime correction map 341, thus outputting the corresponding one of the d- and q-axis deadtime correction voltages Vd_comp$_{DT}$ and Vq_com$_{DT}$.

The phase of each of the d- and q-axis deadtime correction voltages Vd_comp$_{DT}$ and Vq_comp$_{DT}$ output from the pulse pattern modulation deadtime corrector 34 is corrected, by a value determined based on the power factor and the selected switching pulse pattern, relative to a phase that is shifted by 180 electrical degrees relative to the current phase.

The amplitude of each of the d- and q-axis deadtime correction voltages Vd_comp$_{DT}$ and Vq_comp$_{DT}$ output from the pulse pattern modulation deadtime corrector 34 is obtained by, for example, multiplying, by a value determined based on the selected switching pulse pattern and the power factor, the DC voltage Vdc input to the inverter 62.

Note that the correction value for the phase of each of the d- and q-axis deadtime correction voltages Vd_comp$_{DT}$ and Vq_comp$_{DT}$ can be simulated or measured to be implemented in the map 341.

The rectangular modulation mode may maintain the amplitude and phase of each of the d- and q-axis voltage errors due to the respective dead times unchanged, so that it is unnecessary to correct the d-axis command voltage Vd* and the q-axis command voltage Vq* based on d- and q-axis deadtime correction voltages. In contrast, because there may be a large voltage phase error due to the off delay OffD of each switching element 63 to 68 included in each of the d-axis command voltage Vd* and the q-axis command voltage Vq*, it is necessary to correct each of the d-axis command voltage Vd* and the q-axis command voltage Vq* to thereby eliminate or reduce the voltage phase error. This correction will be described later as a modification of the exemplary embodiment.

The voltage drop corrector 36 corrects the d-axis voltage error Vd_err between the d-axis command voltage Vd* and the d-axis actual voltage, and the q-axis voltage error Vq_err between the q-axis command voltage Vq* and the q-axis actual voltage due to the DC voltage drops across the respective switching elements 63 to 68, thus outputting d- and q-axis voltage-drop correction voltages Vd_comp$_{VF}$ and Vq_comp$_{VF}$. The DC voltage drop across a switching element includes a voltage drop Vf across the flyback diode, and a voltage drop Vce across the IGBT of the switching element. If an IGBT and a corresponding flyback diode D of each switching element can be modularized as a power module, the DC voltage drop across the power module can be used as the DC voltage drop of the corresponding switching element.

Figure 11A:
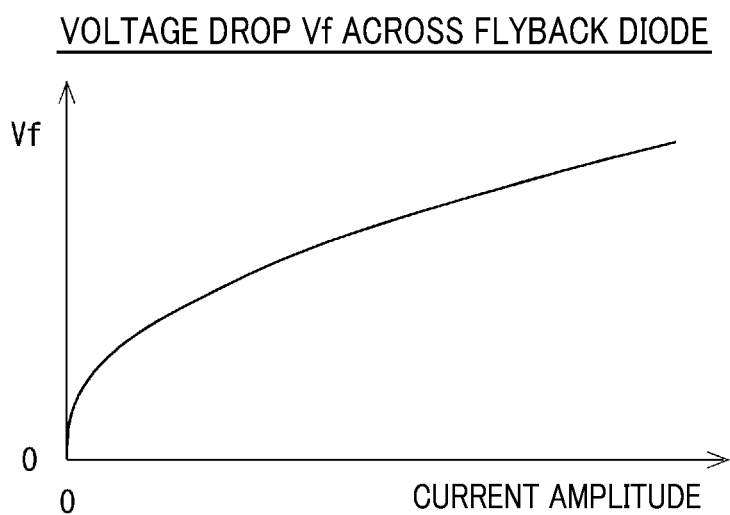
FIG. 11A is a graph schematically illustrating a relationship between a voltage drop across a flyback diode of each switching element and a current amplitude of the switching element according to the exemplary embodiment.
Figure 11B:
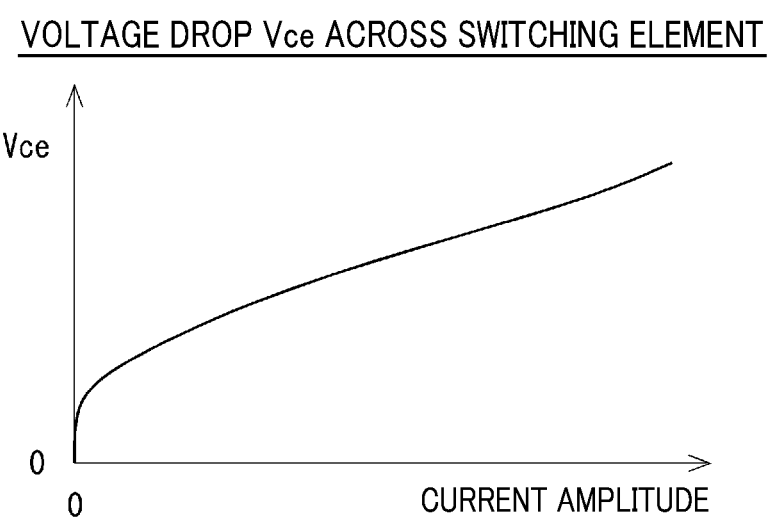
FIG. 11B is a graph schematically illustrating a relationship between a voltage drop across each switching element and a current amplitude of the switching element according to the exemplary embodiment.

FIG. 11A schematically illustrates that the voltage drop Vf across the flyback diode of each switching element 63 to 68 has a positive correlation with the current amplitude of the corresponding switching element, and similarly FIG. 11B schematically illustrates that the voltage drop Vce across the IGBT of each switching element 63 to 68 has a positive correlation with the current amplitude of the corresponding switching element. Note that, because the characteristic curve between the voltage drop Vf across the flyback diode of each switching element 63 to 68 and the current amplitude of the corresponding switching element (see FIG. 11A) is substantially similar to the voltage drop Vce across the IGBT of each switching element 63 to 68 and the current amplitude of the corresponding switching element (see FIG. 11B), it is possible to use one of the voltage drop Vf and the voltage drop Vce as the DC voltage drop across each switching element 63-68.

Figure 12:
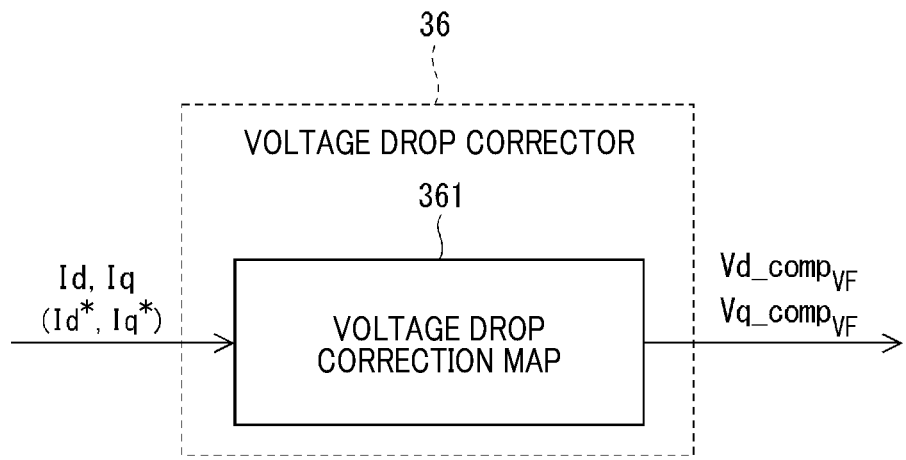
FIG. 12 is a block diagram schematically illustrating an example of how a voltage drop corrector is implemented in the magnetic flux variation estimator illustrated in FIG. 2.

FIG. 12 is a diagram schematically illustrating an example of how the voltage drop corrector 36 is implemented in the magnetic flux variation estimator 30.

The voltage drop corrector 36 includes a voltage drop correction map 361. The voltage drop correction map 361 is designed as, for example, a function that calculates, based on the d- and q-axis currents Id and Iq, as arguments thereto, the d- and q-axis voltage-drop correction voltages Vd_comp$_{VF}$ and Vq_comp$_{VF}$. The d- and q-axis command currents Id* and Iq* can be input to the voltage drop correction map 361 as arguments thereto in place of the d- and q-axis currents Id and Iq if the d- and q-axis command currents Id* and Iq* are close to the respective d- and q-axis currents Id and Iq. As illustrated in FIG. 7B, if the current amplitude of each switching element 63-68 is uniquely determined based on the request torque Trq*, the request torque Trq* can be used as an argument to the voltage drop correction map 361 in place of the d- and q-axis currents Id and Iq.

The phase of each of the voltage-drop correction voltages Vd_comp$_{VF}$ and Vq_comp$_{VF}$ output from the voltage drop corrector 36 is shifted by 180 electrical degrees relative to the current phase, and the amplitude of each of the voltage-drop correction voltages Vd_comp$_{VF}$ and Vq_comp$_{VF}$ output from the voltage drop corrector 36 is corrected by the DC voltage drop from the current amplitude of the corresponding switching element.

That is, correcting the d-axis voltage error Vd_err and the q-axis voltage error Vq_err due to the DC voltage drops across the respective switching elements 63 to 68 enable the accuracy of the corrected q-axis command voltage Vq to the corrected d-axis command voltage Vd to be implemented, making it possible to estimate the magnetic flux variation Δϕ with higher accuracy.

The DC voltage drop Vf and the DC voltage drop Vce across each switching element 63-68 change depending on the temperature of the corresponding switching element, i.e. the inverter temperature T_inv measured by the temperature sensor 76.

Figure 13:
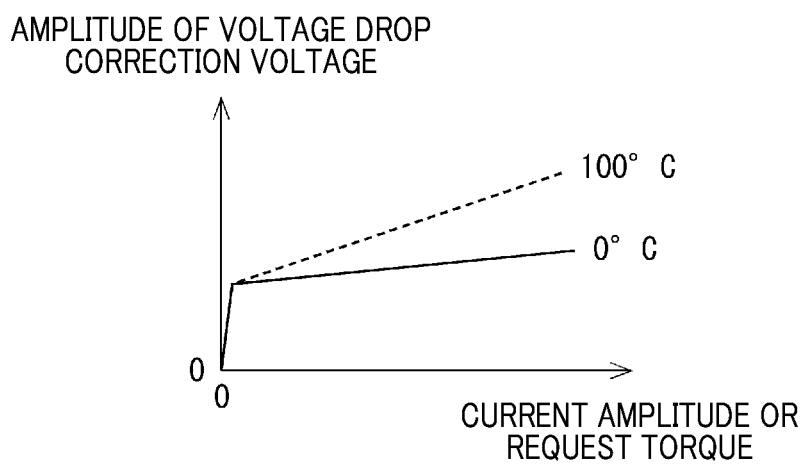
FIG. 13 is a graph schematically illustrating that characteristic curves of the amplitude of each of d- and q-axis voltage-drop correction voltages relative to the current amplitude or the request torque changes depending on the inverter temperature according to the exemplary embodiment.

From this viewpoint, the voltage drop corrector 36 can be configured to change the amplitude of each of the d- and q-axis voltage-drop correction voltages Vd_comp$_{VF}$ and Vq_comp$_{VF}$ in accordance with change of the inverter temperature T_inv as illustrated in FIG. 13. That is, FIG. 13 illustrates that the characteristic curves of the amplitude of each of the d- and q-axis voltage-drop correction voltages Vd_comp$_{VF}$ and Vq_comp$_{VF}$ relative to the current amplitude or the request torque Trq* changes depending on the inverter temperature T_inv.

For example, the inverter temperature T_inv can be added to the arguments to the voltage drop correction map 361. Alternatively, the voltage drop correction map 361 can be configured to change the amplitude of each of the d- and q-axis voltage-drop correction voltages Vd_comp$_{VF}$ and Vq_comp$_{VF}$ output therefrom in accordance with change of the inverter temperature T_inv. This results in a higher accuracy of voltage drop correction of the d- and q-axis command voltages Vd* and Vq*.

If the inverter temperature T_inv is not used as the arguments to the drop correction map 361, the voltage drop corrector 36 can be configured to determine each of the d- and q-axis voltage-drop correction voltages Vd_comp$_{VF}$ and Vq_comp$_{VF}$ in accordance with (1) The temperature characteristic curve of the amplitude of each of the d- and q-axis voltage-drop correction voltages Vd_comp$_{VF}$ and Vq_comp$_{VF}$ at the inverter temperature T_inv of 100° C.

(2) The temperature characteristic curve of the amplitude of each of the d- and q-axis voltage-drop correction voltages Vd_comp$_{VF}$ and Vq_comp$_{VF}$ at the inverter temperature T_inv of 0° C.

(3) The average temperature characteristic curve of the temperature characteristic curve at the inverter temperature T_inv of 100° C. and the temperature characteristic curve at the inverter temperature T_inv of 0° C.

The standard voltage calculator 37 calculates, based on the angular velocity ω, and the d- and q-axis currents Id and Iq or the command d- and q-axis currents Id* and Iq*, the d- and q-axis standard voltages Vd_std and Vq_std that are applied to the MG 80 being in the standard state. The MG 80 being in the standard state is defined as the MG 80 having the predetermined standard temperature range. The above d- and q-axis standard voltages Vd_std and Vq_std can be expressed by the following equations (10.1):

$$Vd\_std = -\omega \times \lambda q + R \times Id$$

$$Vq_{std} = \omega \times \lambda d + R \times Iq \quad (10.1)$$

where:

R represents the winding resistance;

λd represents d-axis flux linkage based on the d-axis current Id

λq represents q-axis flux linkage based on the q-axis current Iq

Note that these parameters Rm, λd, and λq are some of the machine constant parameters of the MG 80.

The standard voltages Vd_std and Vq_std are not necessarily set to constant values, and can be variably set based on the temperatures of predetermined portions of the MG 80 in accordance with the temperature characteristics of each of the winding resistance, each of the d- and q-axis inductances, and the permanent magnet unit 80a2. The standard voltage calculator 37 can be configured to learn values of the respective standard voltages Vd_std and Vq_std at each of operating points of the MG 80 and/or at each of temperatures of the MG 80 while the MG 80 is operating without the occurrence of irreversible demagnetization. That is, the standard voltage calculator 37 can be configured to learn and store (1) A value of the standard voltage Vd_std at each operating point of the MG 80

(2) A value of the standard voltage Vd_std at each temperature of the MG 80

(3) A value of the standard voltage Vq_std at each operating point of the MG 80

(4) A value of the standard voltage Vq_std at each temperature of the MG 80

Then, the standard voltage calculator 37 can be configured to individually set each of the standard voltages Vd_std and Vq_std to a corresponding one of the learned value for the standard voltage Vd_std and the learned value for the standard voltage Vq_std; these learned values for the respective standard voltages Vd_std and Vq_std match with a present operating point and a temperature of the MG 80.

Figure 14:
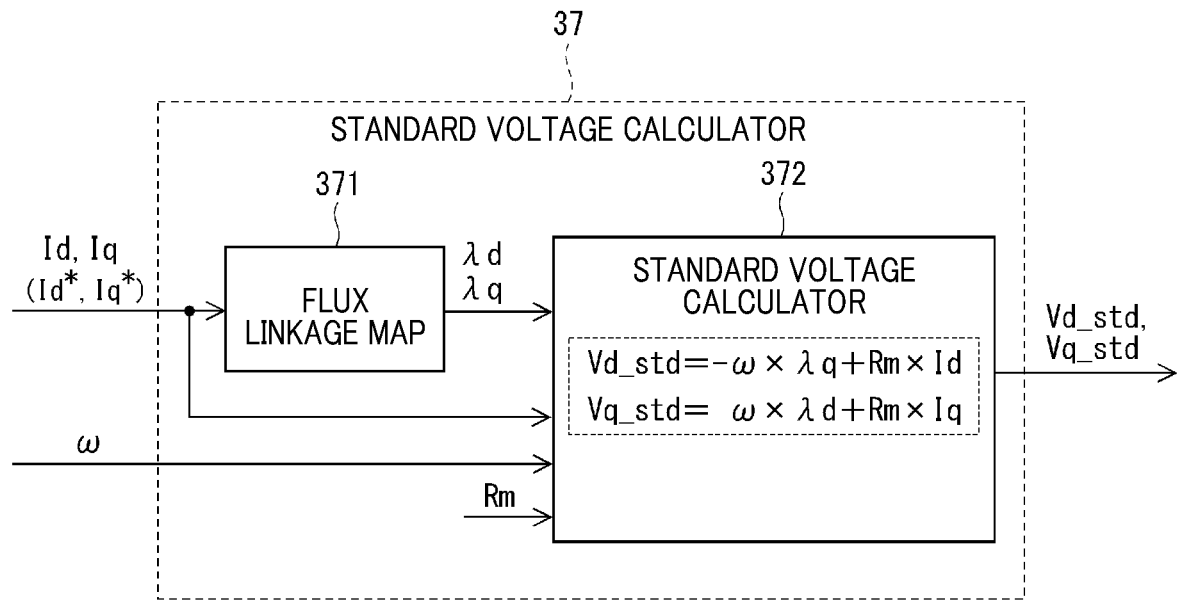
FIG. 14 is a block diagram schematically illustrating an example of how a standard voltage calculator is implemented in the magnetic flux variation estimator illustrated in FIG. 2.

FIG. 14 is a block diagram schematically illustrating an example of how the standard voltage calculator 37 is implemented in the magnetic flux variation estimator 30.

The standard voltage calculator 37 includes a flux linkage map 371 and a standard voltage calculator 372. The flux linkage map 371 is designed as, for example, a function that calculates, based on the d- and q-axis currents Id and Iq, as arguments thereto, the d- and q-axis flux linkages λd and λq. The d- and q-axis command currents Id* and Iq* can be input to the standard voltage calculator 37 as arguments thereto in place of the d- and q-axis currents Id and Iq if the d- and q-axis command currents Id* and Iq* are close to the respective d- and q-axis currents Id and Iq.

The flux linkage map 371 can include a function expressed by the following equations (10.2), and can be configured to calculate, based on the d- and q-axis inductances Ld and Lq and the magnetic flux ϕ of the permanent magnet unit 80a2, the d- and q-axis flux linkages λd and λq in accordance with the equations (10.2):

$$\lambda d = Ld \times Id + \phi$$

$$\lambda q = Lq \times Iq \quad (10.2)$$

The standard voltage calculator 372 receives the d- and q-axis currents Id and Iq, the electrical angular velocity ω, the d and q flux linkages λd and λq, and the winding resistance R. Then, the standard voltage calculator 372 calculates the d- and q-axis standard voltages Vd_std and Vq_std in accordance with the above equations (11).

The estimation calculator 38 is configured to calculate the magnetic flux variation estimate Δϕ$_{est}$ in accordance with the above equation (6). The following describes the calculation of the magnetic flux variation estimate Δϕ$_{est}$ with reference to FIGS. 15 and 16.

Figure 15:
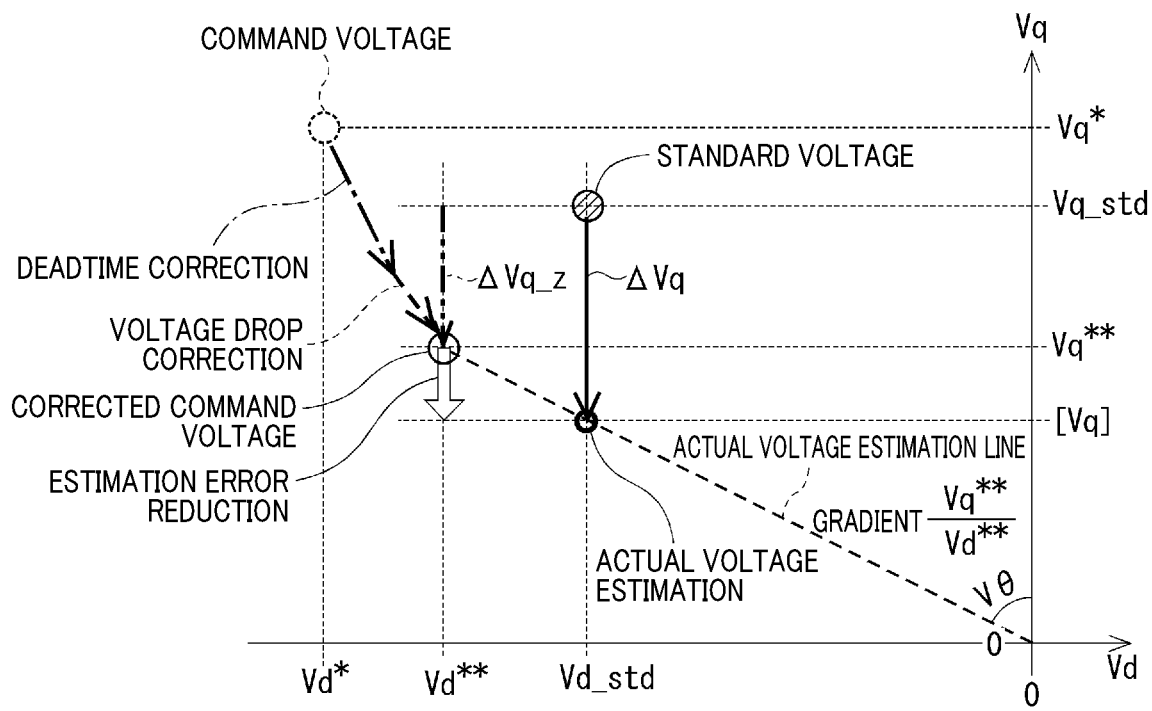
FIG. 15 is a graph schematically illustrating a first example of how to estimate a magnetic flux deviation based on d- and q-axis command voltages according to the exemplary embodiment.
Figure 16:
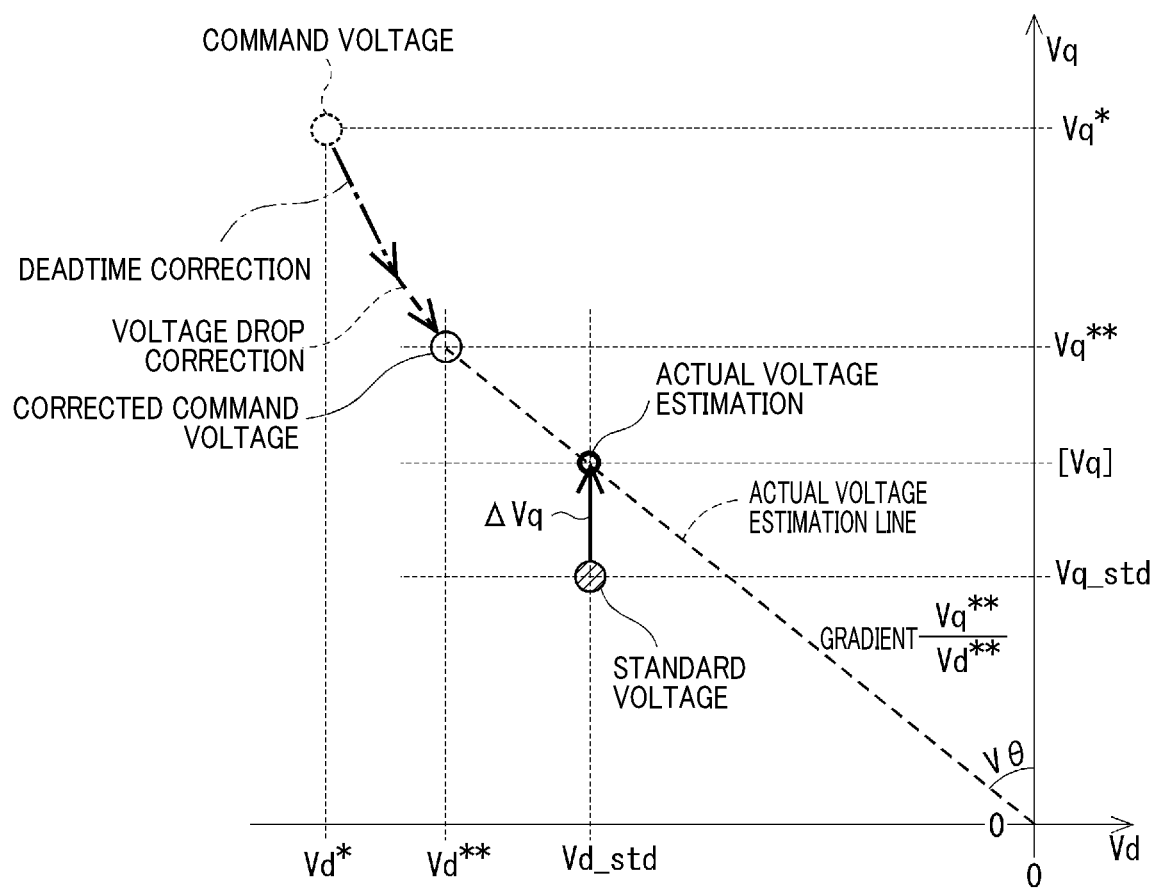
FIG. 16 is a graph schematically illustrating a second example of how to estimate a magnetic flux deviation based on d- and q-axis command voltages according to the exemplary embodiment.

As illustrated commonly in FIGS. 15 and 16, the d and q axis command voltages Vd* and Vq* are respectively corrected to the corrected d- and q-axis command voltages Vd and Vq in the d-q coordinate system. When a straight line connecting the origin of the d-q coordinate system and a coordinate point of the d- and q-axis command voltages (Vd*, Vq*) in the d-q coordinate system is defined as an actual voltage estimation line, the gradient of the actual voltage estimation line is expressed by the ratio $$\frac{Vq^{}}{Vd^{}}$$

of the corrected q-axis command voltage Vq to the corrected d-axis command voltage Vd. In other words, the ratio $$\frac{Vq^{}}{Vd^{}}$$

can be expressed by (1/tan θ) when the phase of the command voltage vector (Vd, Vq) is represented by Vθ.

That is, the q-axis actual voltage estimate [Vq] represents a value corresponding to the d-axis standard voltage Vd_std on the actual voltage estimation line, so that the magnetic-flux variation estimate $\Delta\phi_{est}$ is calculated based on the q-axis voltage deviation ΔVq from the q-axis standard voltage Vq_std to the q-axis actual voltage estimate [Vq] in accordance with the equation (4.2). These are collectively expressed by the equation (6).

FIG. 15 illustrates an example where the q-axis actual voltage estimate [Vq] is smaller than the q-axis standard voltage Vq_std, so that the q-axis voltage deviation ΔVq becomes a negative value, resulting in the magnetic-flux variation estimate $\Delta\phi_{est}$ becoming a negative value. This shows demagnetization of the permanent magnet unit 80a2 at low temperature.

A q-axis voltage calculation method of calculating the magnetic flux estimate based on the corrected q-axis command voltage Vq without using the corrected d-axis command voltage Vd calculates the magnetic-flux variation estimate $\Delta\phi_{est}$ based on a q-axis voltage deviation ΔVqz from the q-axis standard voltage Vq_std to the corrected q-axis command voltage Vq. However, the q-axis voltage calculation method dose not consider a d-axis voltage error between the corrected d-axis command voltage Vd and the actual d-axis voltage.

In contrast, the exemplary embodiment of the present disclosure, which calculates the magnetic-flux variation estimate $\Delta\phi_{est}$ based on the corrected q-axis command voltage Vq and the corrected d-axis command voltage Vd, enables an estimation error indicated by a thick white arrow to be reduced as compared with the q-axis voltage calculation method (see FIG. 15).

FIG. 16 illustrates an example where the q-axis actual voltage estimate [Vq] is larger than the q-axis standard voltage Vq_std, so that the q-axis voltage deviation ΔVq becomes a positive value, resulting in the magnetic-flux variation estimate $\Delta\phi_{est}$ becoming a positive value. This shows, for example, an increase of magnetization of the permanent magnet unit 80a2 at low temperature. Strictly speaking there may be a deviation between the q-axis actual voltage estimate [Vq] and a true actual q-axis voltage independently of the magnitude relationship between the q-axis actual voltage estimate [Vq] and the q-axis standard voltage Vq_std. For this reason, FIGS. 15 and 16 show the deviation between the q-axis actual voltage estimate [Vq] and the q-axis standard voltage Vq_std if the q-axis actual voltage estimate [Vq] and the true actual q-axis voltage are identical to each other.

Note that, in the equation (6), there may be the denominator Vd or the denominator ω may become a value close to zero. For example, the corrected d-axis command voltage Vd becomes close to zero at a low rotational speed or low output torque of the MG 80, and the electrical angular velocity ω becomes close to zero at a low rotational speed of the MG 80. If it is determined that the corrected d-axis command voltage Vd** or the electrical angular velocity ω becomes close to zero, the estimation calculator 38 can be configured to stop calculation of the magnetic flux variation estimate $\Delta\phi_{est}$, thus preventing the result of the calculation from diverging.

As described above, the magnetic flux variation estimator 30 according to the exemplary embodiment is configured such that the command voltage corrector 31 corrects the d-axis command voltage Vd* and the q-axis command voltage Vq* to thereby reduce the d-axis voltage error Vd_err between the d-axis command voltage Vd* and the d-axis actual voltage, and the q-axis voltage error Vq_err between the q-axis command voltage Vq* and the q-axis actual voltage. This enables the q-axis actual voltage to be estimated with higher accuracy without using a q-axis voltage measurement measured by a voltage sensor.

The magnetic flux variation estimator 30 according to the exemplary embodiment is also configured such that the estimation calculator 38 calculating the magnetic flux variation estimate $\Delta\phi_{est}$ using both the corrected d- and q-axis command voltages Vd and Vq with higher accuracy with little influence from variations of the sensor's measurement values and variations of the machine constant parameters.

The following describes the other embodiments or modifications of the exemplary embodiment.

The command voltage corrector 31 includes the deadtime corrector 32 and the voltage drop corrector 36, but can include only one of the deadtime corrector 32 and the voltage drop corrector 36. The command voltage corrector 31 can be configured to correct other voltage errors due to other factors except for the deadtimes and the DC voltage drop across each switching element 33-38.

Because each of the current sensor 70 and the rotational angle sensor 85 used for magnetic flux estimation has a delay in response thereof, the MG control apparatus 20 can be configured to adjust the sampling timing of the at least two-phase currents from the current sensor 70 in accordance with the delay in response of the current sensor 70, and/or correct the sampled at least two-phase currents in accordance with the delay in response of the current sensor 70. This obtains values, which are more accurate as much as possible, of the three-phase currents, thus reducing errors of the magnetic flux estimation due to the delay in response of the current sensor 70.

Similarly, the MG control apparatus 20 can be configured to adjust the sampling timing of the electrical angle θ from the rotational angle sensor 85 in accordance with the delay in response of the rotational angle sensor 85, and/or correct the sampled rotational angle θ in accordance with the delay in response of the rotational angle sensor 85. This obtains a value, which is more accurate as much as possible, of the electrical angle θ, thus reducing errors of the magnetic flux estimation due to the delay in response of the rotational angle sensor 85.

Because the delay in response of each sensor may have temperature characteristics, the MG control apparatus 20 can be configured to variably correct the measurements of the respective sensors 70 and 85 in accordance with their temperature characteristics. How to correct measurements of the current sensor 70 due to the delay in response of the current sensor 70 is disclosed in, for example, Japanese Patent Application Publication No. H09-308300, and how to correct measurements of the rotational angle sensor 85 due to the delay in response of the rotational angle sensor 85 is disclosed in, for example, Japanese Patent Publication No. 3676435.

Figure 17:
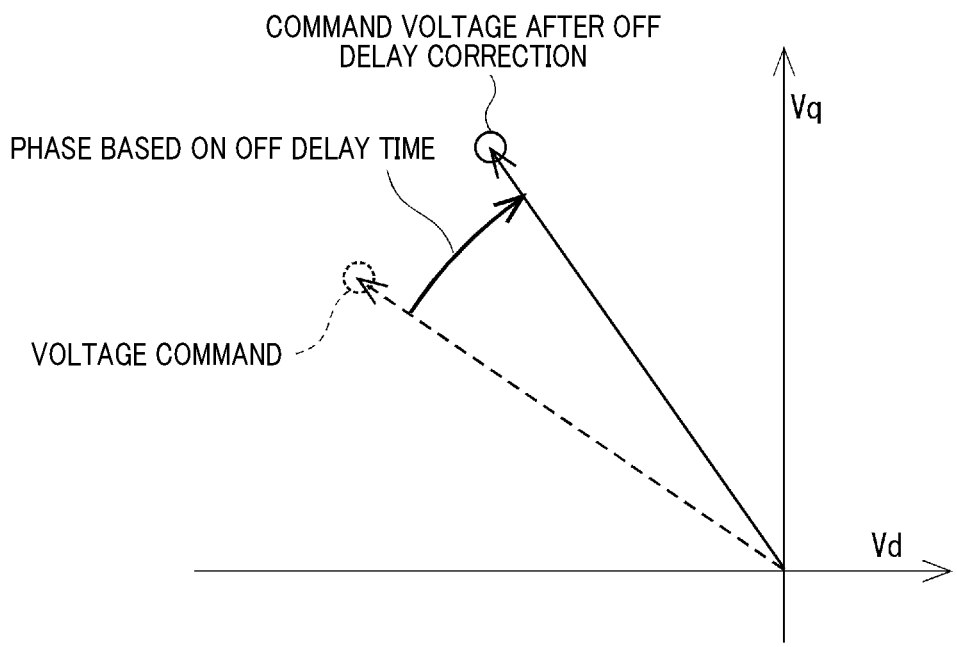
FIG. 17 is a graph schematically illustrating that a phase of an actual dq voltage vector applied to an MG delays relative to a command dq voltage vector according to the exemplary embodiment.

Because each switching element 63 to 68 has the off delay time, i.e. the falling delay time, the phase of an actual dq voltage vector applied to the MG 80 delays relative to the command dq voltage vector (see FIG. 17). For addressing such the phase delay, the magnetic flux variation estimator 30 can be configured to correct the phase of the command voltages Vd* and Vq* in accordance with the product of the off delay time [seconds] and the electrical angular velocity [degree/second], thus reducing errors of the magnetic flux estimation due to the phase delay.

In particular, the rectangular modulation mode is configured to turn on each of the upper- and lower-arm switches for each phase one time per the electrical one period of the MG 80, which corresponds to the electrical 360 degrees.

For this reason, it is difficult to perform the deadtime corrections used in the three-phase modulation mode set forth above.

In the rectangular modulation mode, the magnetic flux variation estimator 30 can be therefore configured to correct the actual voltages applied to the MG 80 such that the delay of the actual voltages applied to the MG 80 relative to the corresponding command voltages by the off delay time is eliminated. The off delay time of each switching element has temperature characteristics of the switching element and dependency of a current flowing through the switching element. For this reason, the magnetic flux variation estimator 30 can be configured to adjust the correction value of the actual voltages applied to the MG 80 in accordance with the temperature of each switching element and/or a current flowing through each switching element.

The estimation calculator 38 according to the exemplary embodiment calculates the magnetic flux variation estimate relative to the standard magnetic flux, but can be configured to calculate a q-axis component of the standard voltage based on the value (Ld×Id), which is obtained by subtracting the magnetic flux ϕ of the permanent magnet unit 80a2 of the MG 80 being in the standard state from the d-axis flux linkage λd (see the equations (10.2) and (4.1)). This enables the absolute value of the magnetic flux of the permanent magnet unit 80a2 to be calculated.

The control apparatuses according to the present disclosure are not limited to be applied to MGs for hybrid vehicles or electric vehicles, and can be applied to various permanent-magnet AC rotary electric machines in various fields. The control apparatuses according to the present disclosure can be applied to multiphase, such as two-phase or four or more phase, AC rotary electric machines.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control apparatus for an alternating-current rotary electric machine including a permanent magnet unit, the control apparatus comprising:
    a command voltage calculator configured to calculate d- and q-axis command voltages based on request torque for the rotary electric machine;
    a power converter configured to convert, based on the d- and q-axis command voltages, input power input thereto into alternating-current power, and supply the alternating-current power to the rotary electric machine; and a magnetic flux variation estimator configured to estimate a magnetic flux variation of the permanent magnet unit relative to standard magnetic flux, the standard magnetic flux being defined as magnetic flux of the permanent magnet unit while the rotary electric machine is in a predetermined standard state,
    the magnetic flux variation estimator comprising:
    a command voltage corrector configured to correct the d- and q-axis command voltages to reduce a deviation between each of the d- and q-axis command voltages and a corresponding actual voltage to be applied to the rotary electric machine, thus outputting a corrected d-axis command voltage and a corrected q-axis command voltage;
    a standard voltage calculator configured to calculate, based on an electrical angular velocity of the rotary electric machine and a current flowing in the rotary electric machine, a d-axis standard voltage and a q-axis standard voltage to be applied to the rotary electric machine while the rotary electric machine is in the predetermined standard state; and
    a magnetic-flux variation calculator configured to estimate the magnetic flux variation as a function of the corrected d-axis command voltage, the corrected q-axis command voltage, and the q-axis standard voltage.

2. The control apparatus according to claim 1, wherein:
    the magnetic-flux variation calculator is configured to:
    multiply, by a ratio of the corrected q-axis command voltage to the corrected d-axis command voltage, the d-axis standard voltage to thereby calculate a q-axis actual voltage estimate; and
    estimate the magnetic flux variation in accordance with a deviation between the q-axis actual voltage estimate and the q-axis standard voltage.

3. The control apparatus according to claim 2, wherein:
    the power converter comprises plural pairs of upper- and lower-arm switching elements for respective plural phases, the plural pairs of upper- and lower-arm switching elements being connected in a bridge configuration, the power converter performing on-off switching operations of the upper- and lower-arm switching elements of the respective pairs such that the upper- and lower-arm switching elements for each phase are simultaneously off during a deadtime; and
    the command voltage corrector comprises:
    a deadtime corrector configured to correct a deadtime voltage error caused, due to the deadtimes, between each of the d- and q-axis command voltages and a corresponding one of the actual voltages.

4. The control apparatus according to claim 3, wherein:
the deadtime corrector configured to:
   calculate a deadtime correction value of each of the d- and q-axis command voltages to correct the deadtime voltage error; and
   change the deadtime correction value of each of the d- and q-axis command voltages in accordance with at least one of: change of an amplitude of the current flowing in the rotary electric machine; and change of the request torque.

5. The control apparatus according to claim 3, wherein:
the deadtime corrector configured to:
   calculate a deadtime correction value of each of the d- and q-axis command voltages to correct the deadtime voltage error; and
   change the deadtime correction value of each of the d- and q-axis command voltages in accordance with change of a temperature of the power converter.

6. The control apparatus according to claim 3, wherein:
the power converter is modulated in a selected one of predetermined modulation modes to thereby perform the on-off switching operations of the upper- and lower-arm switching elements of the respective pairs in accordance with the selected one of the predetermined modulation modes; and
the deadtime corrector configured to:
   calculate a deadtime correction value of each of the d- and q-axis command voltages to correct the deadtime voltage error; and
   change the deadtime correction value of each of the d- and q-axis command voltages in accordance with the selected one of the predetermined modulation modes.

7. The control apparatus according to claim 2, wherein:
the power converter comprises at least one switching element, the power converter performing on-off switching operations of the at least one switching element to thereby convert the input power to the alternating-current power,
the command voltage corrector comprises:
   a voltage drop corrector configured to correct a voltage-drop error caused, due to a direct-current voltage drop across the at least one switching element, between each of the d- and q-axis command voltages and a corresponding one of the actual voltages.

8. The control apparatus according to claim 7, wherein:
the voltage drop corrector configured to:
   calculate a voltage-drop correction value of each of the d- and q-axis command voltages to correct the voltage-drop error; and
   change the voltage-drop correction value of each of the d- and q-axis command voltages in accordance with change of a temperature of the power converter.

9. A control apparatus for an alternating-current rotary electric machine including a permanent magnet unit, the control apparatus comprising:
a memory; and
a processor communicable with the memory,
the processor being configured to:
   calculate d- and q-axis command voltages based on request torque for the rotary electric machine;
   convert, based on the d- and q-axis command voltages, input power input thereto into alternating-current power, thus supplying the alternating-current power to the rotary electric machine
   estimate a magnetic flux variation of the permanent magnet unit relative to standard magnetic flux, the standard magnetic flux being defined as magnetic flux of the permanent magnet unit while the rotary electric machine is in a predetermined standard state,
the processor being configured to
   correct the d- and q-axis command voltages to reduce a deviation between each of the d- and q-axis command voltages and a corresponding actual voltage to be applied to the rotary electric machine, thus outputting a corrected d-axis command voltage and a corrected q-axis command voltage;
   calculate, based on an electrical angular velocity of the rotary electric machine and a current flowing in the rotary electric machine, a d-axis standard voltage and a q-axis standard voltage to be applied to the rotary electric machine while the rotary electric machine is in the predetermined standard state; and
   estimate the magnetic flux variation as a function of the corrected d-axis command voltage, the corrected q-axis command voltage, and the q-axis standard voltage.

10. The control apparatus according to claim 9, wherein:
the processor is configured to:
   multiply, by a ratio of the corrected q-axis command voltage to the corrected d-axis command voltage, the d-axis standard voltage to thereby calculate a q-axis actual voltage estimate; and
   estimate the magnetic flux variation in accordance with a deviation between the q-axis actual voltage estimate and the q-axis standard voltage.

* * * * *